(12) United States Patent
Murashita et al.

(10) Patent No.: US 6,734,869 B2
(45) Date of Patent: *May 11, 2004

(54) INFORMATION PROCESSING APPARATUS, PROFILE DATA CREATING METHOD, DISPLAY UNIT AND STORAGE MEDIUM

(75) Inventors: Kimitaka Murashita, Kawasaki (JP); Masayoshi Shimizu, Kawasaki (JP); Shoji Suzuki, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,991

(22) Filed: May 21, 1999

(65) Prior Publication Data

US 2002/0093509 A1 Jul. 18, 2002

(30) Foreign Application Priority Data

Sep. 18, 1998 (JP) ............................. 10-265136

(51) Int. Cl.$^7$ ................................. G09G 5/02
(52) U.S. Cl. .................. 345/589; 345/593; 345/690
(58) Field of Search ................. 345/112, 121, 345/150, 153, 154, 199, 431, 22, 589, 591, 593, 594, 690; 358/504, 505, 518–525; 382/162, 167, 165; 700/1, 29–34, 42, 43, 52, 129

(56) References Cited

U.S. PATENT DOCUMENTS

| | | | | | |
|---|---|---|---|---|---|
| 3,748,046 | A | * | 7/1973 | Murray ........................ | 356/195 |
| 3,961,242 | A | * | 6/1976 | Rose ............................ | 358/10 |
| 5,363,197 | A | | 11/1994 | Ohno et al. | |
| 5,579,031 | A | | 11/1996 | Liang | |
| 5,884,012 | A | * | 3/1999 | Takahashi ..................... | 395/106 |
| 5,917,939 | A | * | 6/1999 | Ohta et al. ................... | 382/167 |
| 6,108,442 | A | * | 8/2000 | Edge et al. ................... | 382/167 |
| 6,124,884 | A | * | 9/2000 | Fujii et al. ..................... | 348/93 |
| 6,130,961 | A | * | 10/2000 | Akioka et al. ................ | 382/167 |
| 6,229,626 | B1 | * | 5/2001 | Boll ............................. | 358/1.9 |
| 6,269,482 | B1 | * | 7/2001 | Gershfeld ..................... | 725/107 |
| 6,313,823 | B1 | * | 11/2001 | Cappels et al. .............. | 345/150 |

FOREIGN PATENT DOCUMENTS

| | | |
|---|---|---|
| EP | 0 347 191 | 12/1989 |
| EP | 0 785 672 | 7/1997 |
| JP | 9-298674 | 11/1997 |

OTHER PUBLICATIONS

Adobe Systems Incorporated, Adobe Photoshop, 1993, Hayden Books, pp. 128–130.*
Merriam Webster, Collegiate Dictionary, 1997, Merriam Webster, Tenth Edition, p. 793.*

* cited by examiner

Primary Examiner—Matthew C. Bella
Assistant Examiner—D. F. Cunningham
(74) Attorney, Agent, or Firm—Staas & Halsey LLP

(57) ABSTRACT

An information processing apparatus is constructed to include a color display part for simultaneously displaying a reference color patch and at least one measuring color patch which is to be measured, on a display unit.

22 Claims, 27 Drawing Sheets

|   | X | Y | Z | x | y | u' | v' |
|---|---|---|---|---|---|----|----|
| RED | 43.200 | 24.060 | 2.958 | 0.615 | 0.343 | 0.418 | 0.524 |
| GREEN | 29.040 | 64.400 | 11.970 | 0.275 | 0.611 | 0.113 | 0.562 |
| BLUE | 17.660 | 6.559 | 97.740 | 0.145 | 0.054 | 0.173 | 0.144 |
| WHITE | 88.180 | 94.710 | 105.900 | 0.305 | 0.328 | 0.193 | 0.467 |

$$x = \frac{X}{X+Y+Z} \qquad y = \frac{Y}{X+Y+Z}$$

$$u' = \frac{4X}{X+15Y+3Z} \qquad v' = \frac{9Y}{X+15Y+3Z}$$

$$\gamma = \frac{1}{D} n \left[ \sum_{i=1}^{n} P_i q_i - \sum_{i=1}^{n} P_i \sum_{i=1}^{n} q_i \right]$$

$P_i = \log_{10} x_i$     $\begin{cases} x_i & \text{INPUT VOLTAGE} \\ y_i & \text{DISPLAYED LUMINANCE} \end{cases}$
$q_i = \log_{10} y_i$ $$D = n \sum_{i=1}^{n} P_i^2 - \left[ \sum_{i=1}^{n} P_i \right]^2$$

FIG. 4

| COLOR | CIEXYZ | | |
|---|---|---|---|
| | X | Y | Z |
| RED (255, 0, 0) | 44.55 | 26.15 | 2.9 |
| GREEN (0, 255, 0) | 21.16 | 54.93 | 8.54 |
| BLUE (0, 0, 255) | 21.04 | 16.74 | 82.25 |
| WHITE(255, 255, 255) | 42.7 | 49.12 | 46.71 |

FIG. 5

| COLOR | CIEXYZ | | |
|---|---|---|---|
| | X | Y | Z |
| RED (255, 0, 0) | 29.28 | 16.18 | 1.58 |
| GREEN (0, 255, 0) | 30.53 | 64.84 | 11.09 |
| BLUE (0, 0, 255) | 21.61 | 9.63 | 116.2 |
| WHITE(255, 255, 255) | 81.31 | 90.39 | 125.3 |

FIG. 13A

| COLOR | LUMINANCE VALUE |
|---|---|
| REFERENCE COLOR | 120cd/m^2 |
| COLOR 1 | 24cd/m^2 |
| COLOR 2 | 79cd/m^2 |
| COLOR 3 | 33cd/m^2 |

FIG. 13B

| COLOR | RATIO WITH RESPECT TO REFERENCE VALUE |
|---|---|
| REFERENCE COLOR | 1.0 |
| COLOR 1 | 0.200 |
| COLOR 2 | 0.658 |
| COLOR 3 | 0.275 |

FIG. 14A

| COLOR | LUMINANCE VALUE |
|---|---|
| REFERENCE COLOR | 88cd/m^2 |
| COLOR 1 | 18cd/m^2 |
| COLOR 2 | 58cd/m^2 |
| COLOR 3 | 24cd/m^2 |

FIG. 14B

| COLOR | RATIO WITH RESPECT TO REFERENCE VALUE |
|---|---|
| REFERENCE COLOR | 1.0 |
| COLOR 1 | 0.200 |
| COLOR 2 | 0.658 |
| COLOR 3 | 0.275 |

F I G. 2 1
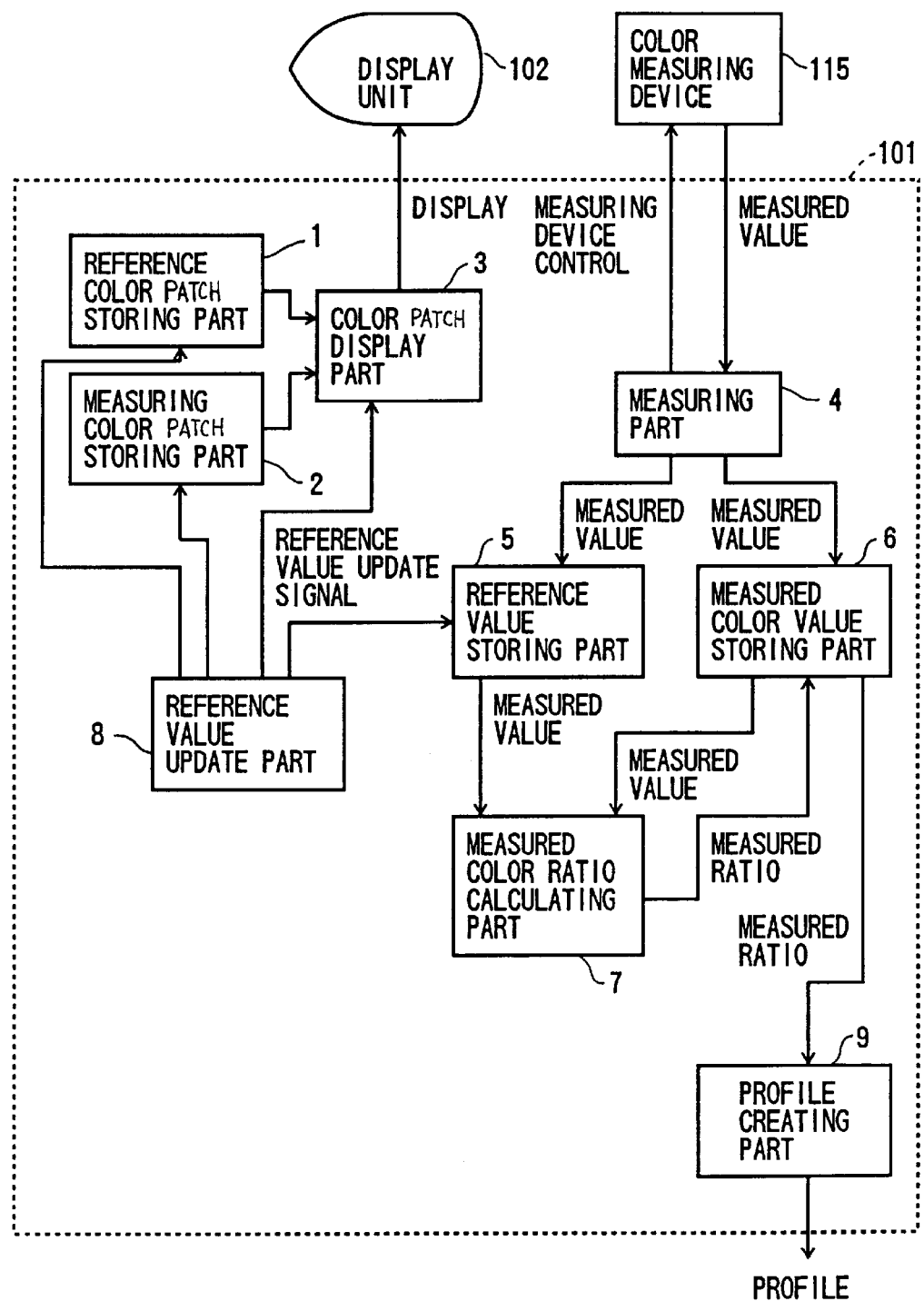

INFORMATION PROCESSING APPARATUS, PROFILE DATA CREATING METHOD, DISPLAY UNIT AND STORAGE MEDIUM

BACKGROUND OF THE INVENTION

1. Field of the Invention

The present invention generally relates to information processing apparatuses, profile data creating methods, display units and storage mediums, and more particularly to an information processing apparatus, a profile data creating method and a display unit which are suited for generating a profile of the display unit, and to a computer-readable storage medium which stores a program suited for causing a computer to generate the profile of the display unit.

Due to the popularization of high-performance personal computers and inexpensive image input and/or output (input/output) devices such as scanners and printers, there are increased opportunities to process color images not only for business use but also for personal use. As the opportunities to process color images increase, the color reproducibility becomes a problem. In other words, there is a problem in that the color of the image displayed on a display screen of a display unit or the color of the image printed by a printer cannot be reproduced with the same color as the original image. Among different input/output devices, color characteristics such as a color generating mechanisms and a color reproduction region differ, thereby causing the problem described above.

A Color Management System (CMS) is a technology for matching the manners in which the color is visible among the different input/output devices. By use of the CMS, it becomes possible to match the manners in which the color is visible between an image read by a scanner and an image displayed on the display unit or, between an image printed by the printer and the image read by the scanner or the image displayed on the display unit. By use of the CMS, it is possible to build a system which will not make a user feel uncomfortable or unnatural with respect to the image.

Recently, for example, Image color Matching (ICM) 1.0 of Windows 95 and ColorSync 2.0 of Macintosh (both registered trademarks) have the CMS framework built into the operating system (OS) level. Manufacturers of the input/output devices provide device profiles matching the ICM 1.0, the ColorSync 2.0 or the like with respect to the users, so that it is possible to obtain images which will not make the users feel uncomfortable or unnatural with respect to the images obtained among the different devices, such as the image displayed on the display device and the image printed by the printer. The device profiles matching the ICM 1.0, the ColorSync 2.0 or the like is in conformance with an International Color Consortium (ICC) profile proposed by the ICC. Accordingly, by providing profiles in conformance with the ICC profile specifications, manufacturers of the input/output devices can make it possible for the users in the Windows environment and the users in the Macintosh environment to use the profiles in a similar manner and to obtain images which will not make the users feel uncomfortable or unnatural with respect to the images obtained among the different devices.

2. Description of the Related Art

When carrying out the CMS in the conventional computer environment, the ICC profile is generally used as information containing characteristics of the input/output device. FIG. 1 is a diagram for explaining the structure of the ICC profile. In the ICC profile, the necessary data are all described by tags. As shown in FIG. 1, the ICC profile is made up of a profile header indicating information of the profile itself and information of a target input/output device, a tag table indicating kinds of information stored, and a tagged element data actually storing information. The profile header has a fixed length of 128 bytes. The tag table has a variable length of (4+12n) bytes with respect to n which indicates the number of tags, and includes an identifier, a storage address and a size. The tagged element data has a variable length, and contains information indicating the characteristics of the input/output device.

FIG. 2 is a diagram showing a CIE XYZ uniform color space, and FIG. 3 is a diagram showing input/output characteristics of each of the colors read (R), green (G) and blue (B). In FIG. 3, the ordinate indicates a displayed luminance in arbitrary units, and the abscissa indicates an input voltage in arbitrary units.

It is possible to know a display characteristic of a display unit which is one example of the input/output device, from CIE XYZ values of the colors R, G and B shown in FIG. 2 when the colors R, G, and B respectively have maximum values Rmax, Gmax and Bmax (white Wmax), and from the input/output characteristics of the colors R, G and B shown in FIG. 3. The CIE XYZ values of the colors R, G and B shown in FIG. 2 are called a color reproduction range CR related to colors which can be discriminated by the human eye, and the input/output characteristics of the colors R, G and B shown in FIG. 3 are called γ-characteristics.

The CIE XYZ values of the colors R, G and B are stored in rXYZ, gXYZ and bXYZ tags of the ICC profile for the display unit, as information of the color reproduction range CR. In addition, input/output point values of the colors R, G and B are stored in rTRC, gTRC and bTRC tags of the ICC profile as the γ-characteristics. In the ICC profile, it is indicated that a γ-coefficient of the color is 1.0 when the number of points within the tag is 0, and the value of the γ-coefficient itself is stored when the number of points is 1. Moreover, when the number of points within the tag is 2 or greater, the same number of input/output point values are stored in the ICC profile. Furthermore, in the ICC profile, the CIE XYZ value when the white has the maximum value Wmax is stored in a wtpt tag as standard white information of the display unit. Each of the tags described above is stored in the ICC profile shown in FIG. 1 as the tag element data.

Therefore, the 7 kinds of information described above are generally stored in the ICC profile of the display unit. The 7 kinds of information can be obtained by displaying color data on the display unit and measuring the displayed luminance and the CIE XYZ values by a color measuring device such as a spectral radiance measuring device.

In display units such as a Plasma Display Panel (PDP) having a high power consumption, a power control is carried out to suppress the power consumption. In other words, an applying voltage applied to the PDP is reduced in a case where the power consumption is large such as when making a display which includes a large amount of white, and the applying voltage applied to the PDP is increased in a case where the power consumption is small such as when making a display which includes a large amount of dark colors such as gray and blue, so as to control the voltage applied to the PDP so that dark colors are displayed more brightly. In the display unit which carries out such a power control, measured results may indicate that the displayed luminance of blue is brighter than the displayed luminance of white.

FIGS. 4 and 5 are diagrams showing measured results of actual displays on the display unit. FIG. 4 shows the measured results of the display unit which controls the applying voltage, and FIG. 5 shows the measured results of the display unit which does not control the applying voltage. More particularly, FIG. 4 shows the measured result of the PDP, and FIG. 5 shows the measured results of a CRT.

In the measured results shown in FIG. 4, the X value of red is greater than the X value of white, and the Y value of green is greater than the Y value of white, for example. On the other hand, in the measured results shown in FIG. 5, a relationship R(X, Y, Z)+G(X, Y, Z)+B(X, Y, Z)=W(X, Y, Z) stands.

In the display unit, the color reproduction range information and the standard white information are used on the precondition that the additive mixture of color stimuli stands. For this reason, there was a problem in that it is impossible to create the profile of the display unit from the measured results shown in FIG. 4 in which the additive mixture of color stimuli does not stand. In other words, the color reproduction range information and the standard white information must be measured under the same conditions, but in the display unit which carries out the power control described above, the applying voltage is freely controlled, for example, thereby changing the conditions such as the applying voltage depending on the displayed color. Because the measurements are not made under the same conditions when the power control is carried out, it is impossible to create the profile of the display unit from the measured results.

On the other hand, in the PDP, a slight light emission may occur even when displaying black, due to the structure of the PDP. This slight light emission is sometimes referred to as a back light emission which causes considerably errors when creating the profile.

SUMMARY OF THE INVENTION

Accordingly, it is a general object of the present invention to provide a novel and useful information processing apparatus, profile data creating method, display unit and storage medium, in which the problems described above are eliminated.

Another and more specific object of the present invention is to provide an information processing apparatus, profile data creating method, display unit and storage medium, which enable a profile of the display unit to be created from measured results of the display made on the display unit, even in the case of a display unit which carries out a power control or the like and the same measuring conditions cannot be set by a user.

Still another object of the present invention is to provide an information processing apparatus comprising a color display simultaneously displaying a reference color patch and at least one measuring color patch which is to be measured. According to the information processing apparatus of the present invention, it is possible to create the profile of a display unit from the measured results of the colors of the color patches displayed on the display unit, even in the case of the display unit which carries out a power control or the like and the same measuring conditions cannot be set by a user.

A further object of the present invention is to provide a computer-readable storage medium which stores a program for causing a computer to display an image, comprising color display means for causing the computer to simultaneously display on a display unit a reference color patch and at least one measuring color patch which is to be measured. According to the storage medium of the present invention, it is possible to create the profile of the display unit from the measured results of the colors of the color patches displayed on the display unit, even in the case of the display unit which carries out a power control or the like and the same measuring conditions cannot be set by a user.

Another object of the present invention is to provide a display unit comprising a display screen, wherein the display screen displays a reference color patch which is used as a reference color, and at least one measuring color patch of a color different from that of the reference color patch. According to the display unit of the present invention, it is possible to create the profile of the display unit from the measured results of the colors of the color patches displayed on the display unit, even in the case of the display unit which carries out a power control or the like and the same measuring conditions cannot be set by a user.

Still another object of the present invention is to provide a profile data creating method for creating a profile data which is used to correct a display characteristic of a display unit corresponding to an input color signal, comprising a displaying step displaying, on a screen of the display unit, a reference color patch which is used as a reference color, and a measuring color patch of a color different from that of the reference color patch, a calculating step calculating a ratio of a measured value of the reference color patch and a measured value of the measured color patch which are measured from the screen, and a creating step creating a profile data based on the calculated ratio of the measured values. According to the profile data creating method of the present invention, it is possible to create the profile of the display unit from the measured results of the color patches displayed on the display unit, even in the case of the display unit which carries out a power control or the like and the same measuring conditions cannot be set by a user.

A further object of the present invention is to provide a profile data creating method for creating a profile data which is used to correct a display characteristic of a display unit corresponding to an input color signal, comprising a calculating step calculating relative values of a measured value of a reference color patch which is used as a reference color, and a measured value of a measuring color patch of a color different from that of the reference color patch, and a creating step creating a profile data based on the calculated relative values. According to the profile data creating method of the present invention, it is possible to create the profile of the display unit from the measured results of the color patches displayed on the display unit, even in the case of the display unit which carries out a power control or the like and the same measuring conditions cannot be set by a user.

Other objects and further features of the present invention will be apparent from the following detailed description when read in conjunction with the accompanying drawings.

BRIEF DESCRIPTION OF THE DRAWINGS

FIG. 4 is a diagram showing measured results of a display unit which controls an applying voltage;

FIG. 5 is a diagram showing measured results of a display unit which does not control an applying voltage;

FIGS. 13A and 13B respectively are diagrams for explaining a ratio of each measuring color with respect to the reference color obtained in the second embodiment;

FIGS. 14A and 14B respectively are diagrams for explaining the ratio of each measuring color with respect to the reference color obtained in the second embodiment;

FIG. 21 is a functional block diagram showing the construction within the main body part of the computer system in a seventh embodiment;

DESCRIPTION OF THE PREFERRED EMBODIMENTS

When recognizing a color by the human eyes, a viewed color is compared with a reference color so as to recognize the tone of color of the viewed color. In the ICC profile, relative values with respect to the standard white are stored in the profile, by using the standard white as a reference. The present invention notes that, an absolute value of a measured value of a color is not always required to describe a color characteristic, and that the color characteristic can be described by a relative value with respect to a reference color.

In addition, even in the case of a display unit which automatically controls an applying voltage or the like, all of the colors are displayed under the same conditions on the same screen, and on the same screen, the colors have the characteristic of the additive mixture of color stimuli shown in FIG. 5. For this reason, even when a displayed luminance changes due to a change in the applying voltage, the relative value with respect to the reference color remains constant.

Accordingly, by determining the reference color in advance, displaying the reference color and a measuring color which is to be measured on a display unit, and recording a relative value of the measured color with respect to the reference color, it becomes possible to obtain a display characteristic of the display unit. More particularly, it is possible to simultaneously display a reference color patch or the like and the measuring color.

The reference color is not limited to a specific color, however, it is desirable that the reference color is white which has a maximum luminance for each of the primary colors R, G and B.

Next, a description will be given of embodiments of the present invention, by referring to FIG. 6 and subsequent drawings.

Figure 6:
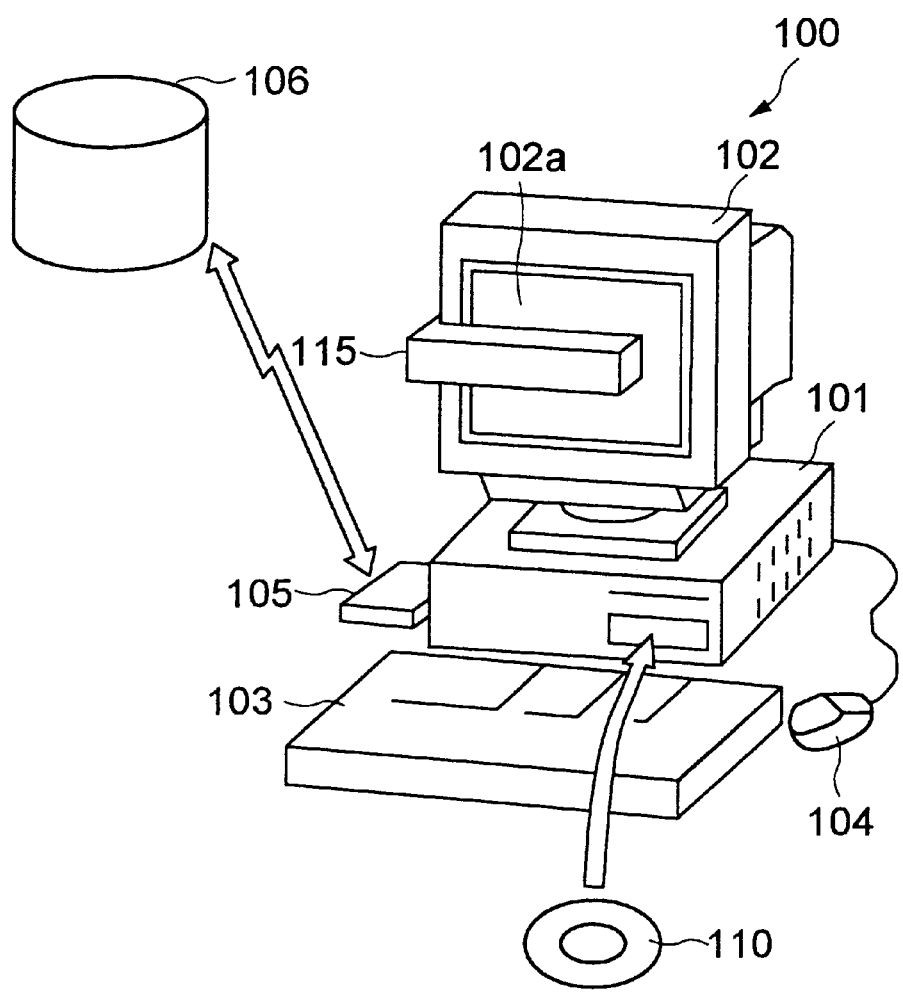
FIG. 6 is a perspective view showing a first embodiment of an information processing apparatus according to the present invention.

FIG. 6 is a perspective view showing a first embodiment of an information processing apparatus according to the present invention. This embodiment of the information processing apparatus simultaneously displays a reference color patch and at least one measuring color which is to be measured on an embodiment of a display unit according to the present invention, based on a program which is stored in a first embodiment of a storage medium according to the present invention.

A computer system 100 shown in FIG. 6 is formed by a general computer system such as a personal computer. The computer system 100 generally includes a main body part 101 which includes a CPU, a disk drive and the like, a display unit 102 which displays an image on a display screen 102a in response to an instruction from the main body part 101, a keyboard 103 which is used to input various kinds of information to the computer system 100, a mouse 104 which is used to specify an arbitrary position on the display screen 102a, a modem 105 which is used to make access to an external database or the like and to download a program or the like stored in another computer system, and a color measuring device 115. The color measuring device 115 has a known construction for measuring a color displayed at various parts on the display screen 102a, and is movable vertically and horizontally by a driving means. A program which is stored in a portable recording medium such as a disk 110 or is downloaded from a recording medium 106 of another computer system by use of a communication unit such as the modem 105, is input to and is compiled in the computer system 100. This program includes a program for causing the CPU of the computer system 100 to carry out a process of simultaneously displaying a reference color patch and at least one measuring color which is to be measured on the display unit 102.

This embodiment of the storage medium is formed by a recording medium such as the disk 110 which stores the program described above. The recording medium is of course not limited to a portable or removable recording medium such as IC card memories, floppy disks, magneto-optical disks, CD-ROMs and various semiconductor memory devices, and also includes recording mediums which are accessible by a computer system which is coupled via a communication means or a communication unit such as the modem and LAN.

Figure 7:
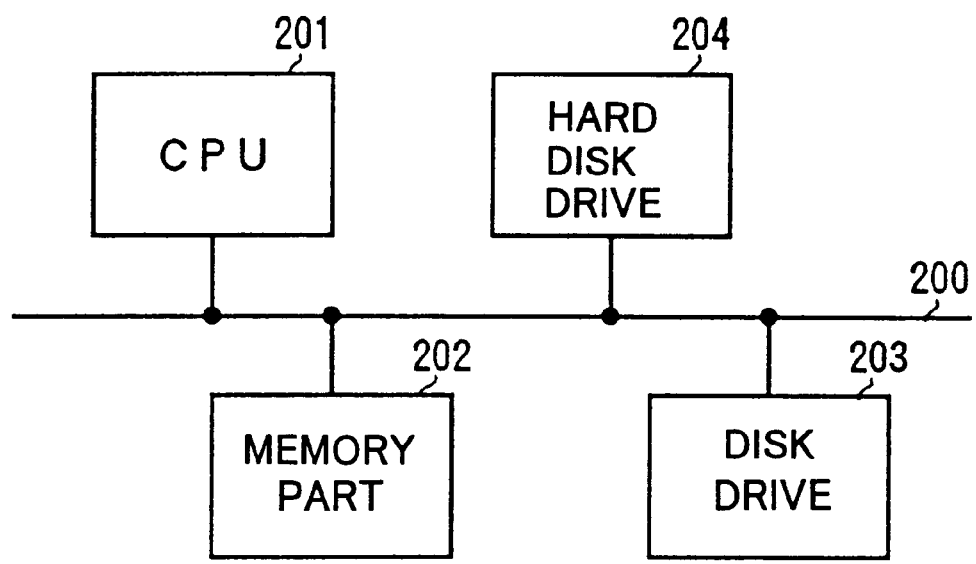
FIG. 7 is a system block diagram showing an important part of the information processing apparatus shown in FIG. 6.

FIG. 7 is a system block diagram showing the construction of an important part within the main body part 101 of the computer system 100. In FIG. 7, the main body part 101 generally includes a CPU 201, a memory part 202 including a RAM, ROM or the like, a disk drive 203 for the disk 110, and a hard disk drive 204 which are coupled via a bus 200. The display unit 102, the color measuring device 115 and the like are coupled to the bus 200.

The construction of the computer system 100 is not limited to that shown in FIGS. 6 and 7, and various known constructions may be used in place thereof.

Figure 8:
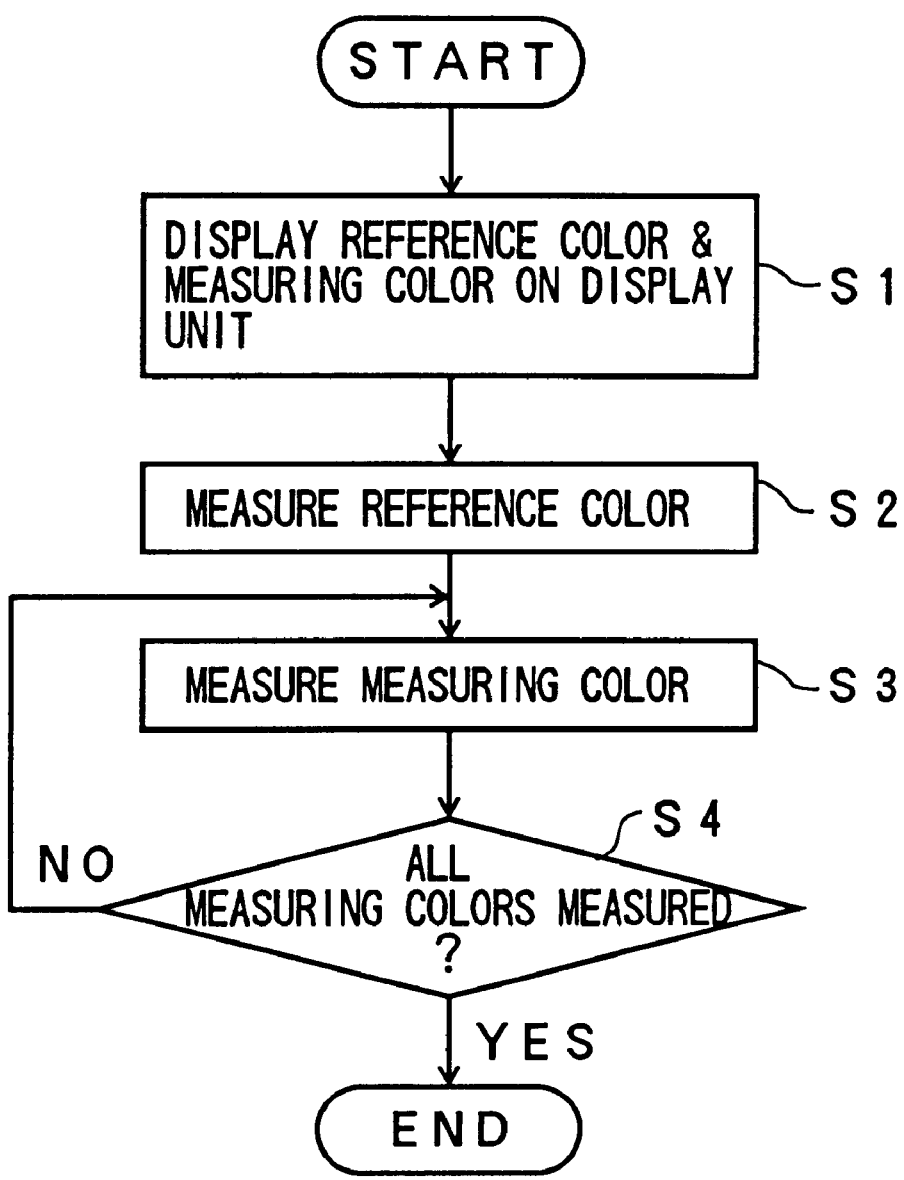
FIG. 8 is a flow chart for explaining the operation of the CPU in the first embodiment.

FIG. 8 is a flow chart for explaining the operation of the CPU 201 in the first embodiment. In FIG. 8, a step S1 simultaneously displays a reference color patch and at least one measuring color which is to be measured on the display screen 102a of the display unit 102. In this embodiment, the reference color patch and a plurality of measuring colors are displayed simultaneously. A step S2 measures the reference color displayed on the display screen 102a by use of the color measuring device 115, and stores a measured value in the memory part 202, for example. A step S3 measures the measuring color displayed on the display screen 102a by use of the color measuring device 115, and stores a measured value in the memory part 202, for example. A step S4 decides whether or not all of the measuring colors displayed on the display screen 102a are measured. The process returns to the step S3 if the decision result in the step S4 is NO. On the other hand, the process ends if the decision result in the step S4 is YES.

Figure 9:
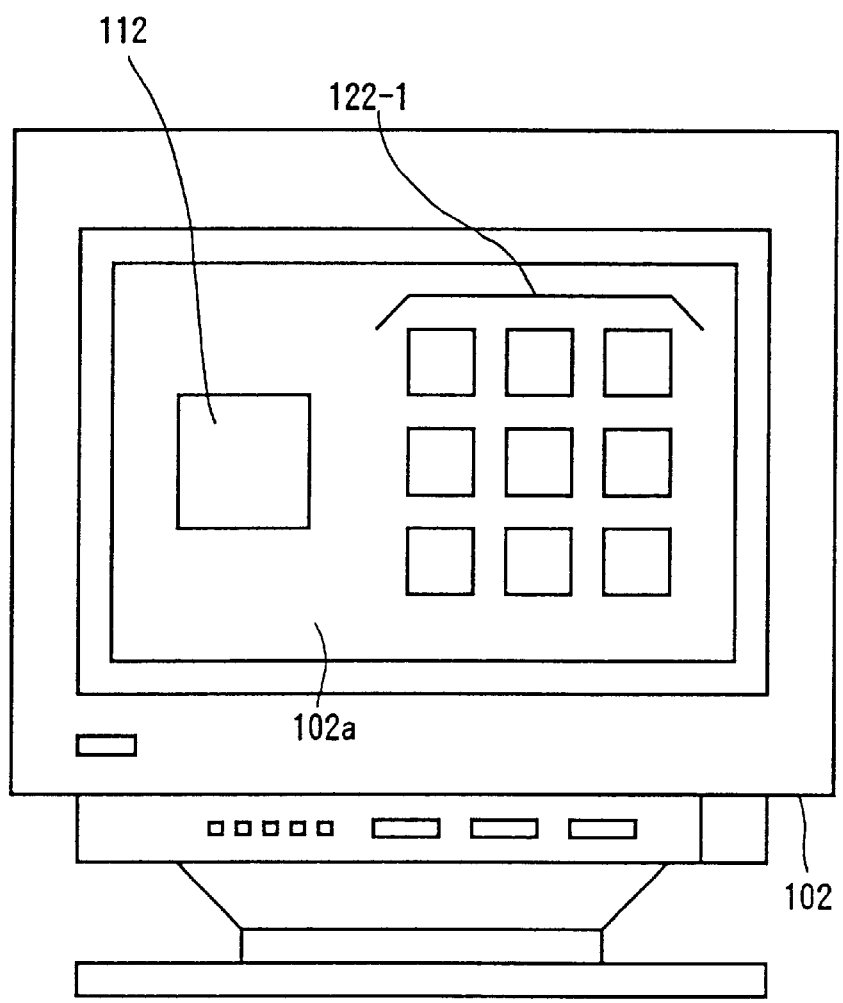
FIG. 9 is a diagram showing a case where white is displayed as a reference color and 9 kinds of red are displayed as measuring colors on a display screen in the first embodiment.

FIG. 9 is a diagram showing a case where the step S1 displays, as the reference color, white which has a RGB value (R, G, B)=(255, 255, 255) in a region 112 on the display screen 102a, and displays, as the measuring colors, 9 kinds of red having different gradations with RGB values (R, G, B)=(0, 0, 0), (32, 0, 0), (64, 0, 0), . . . , (255, 0, 0) in a region 122-1 on the display screen 102a. In this case, the steps S2 and S3 measure the reference color white and the 9 kinds of measuring color red, so as to obtain a display characteristic of the display unit 102 for the color red.

Figure 10:
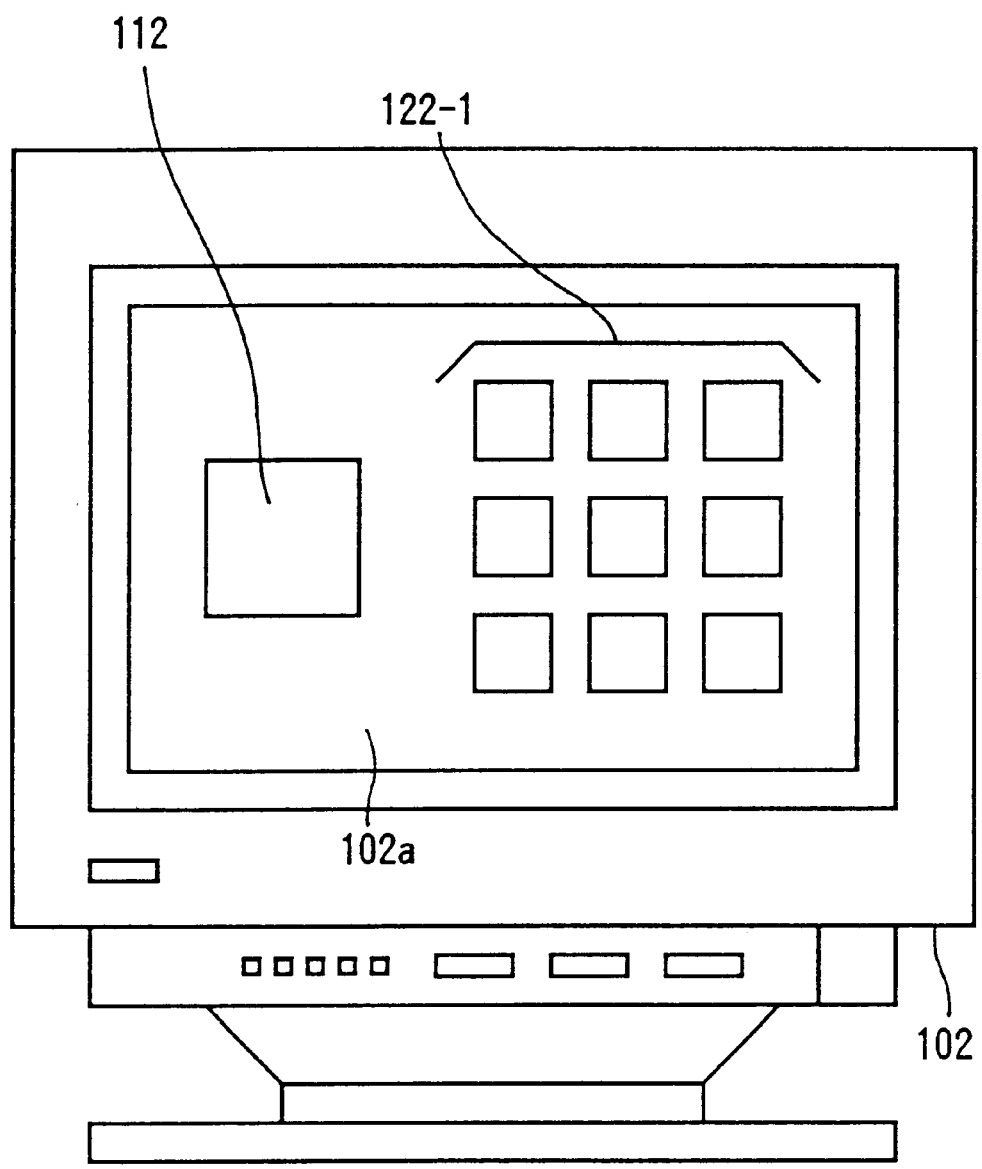
FIG. 10 is a diagram showing a case where white is displayed as the reference color and 9 kinds of green are displayed as the measuring colors on the display screen in the first embodiment.

FIG. 10 is a diagram showing a case where the step S1 displays, as the reference color, white which has a RGB value (R, G, B)=(255, 255, 255) in the region 112 on the display screen 102a, and displays, as the measuring colors, 9 kinds of green having different gradations with RGB values (R, G, B)=(0, 0, 0), (0, 32, 0), (0, 64, 0), . . . , (0, 255, 0) in the region 122-1 on the display screen 102a. In this case, the steps S2 and S3 measure the reference color white and the 9 kinds of measuring color green, so as to obtain a display characteristic of the display unit 102 for the color green.

In addition, by comparing the measured values of the red with respect to the reference color which are obtained by measuring the display on the display screen 102a shown in FIG. 9 and the measured values of the green with respect to the reference color which are obtained by measuring the display on the display screen 102a shown in FIG. 10, it is possible to obtain a correlation between red and green. Furthermore, a correlation between red and blue and a correlation between blue and green can be obtained similarly. By similarly carrying out the measurement and the comparison with respect to the 3 colors red, green and blue, it is possible to obtain the display characteristic of the display unit 102.

In this embodiment, the display unit 102 is a color display unit, and colors are used for the measuring colors. However, gray, for example, may be used as the measuring color in the case of a monochrome display unit. In the case of the monochrome display unit, it is possible to obtain a display characteristic of the monochrome display unit by displaying and measuring the reference color white and a plurality of gray having different tones.

Even in the case where the display unit 102 is a color display unit, it is possible to use, as the measuring colors, grays which have the same R, G, B ratios but have different luminances. In this case, it is possible to measure R, G and B in one operation by using the grays as the measuring colors.

Figure 11:
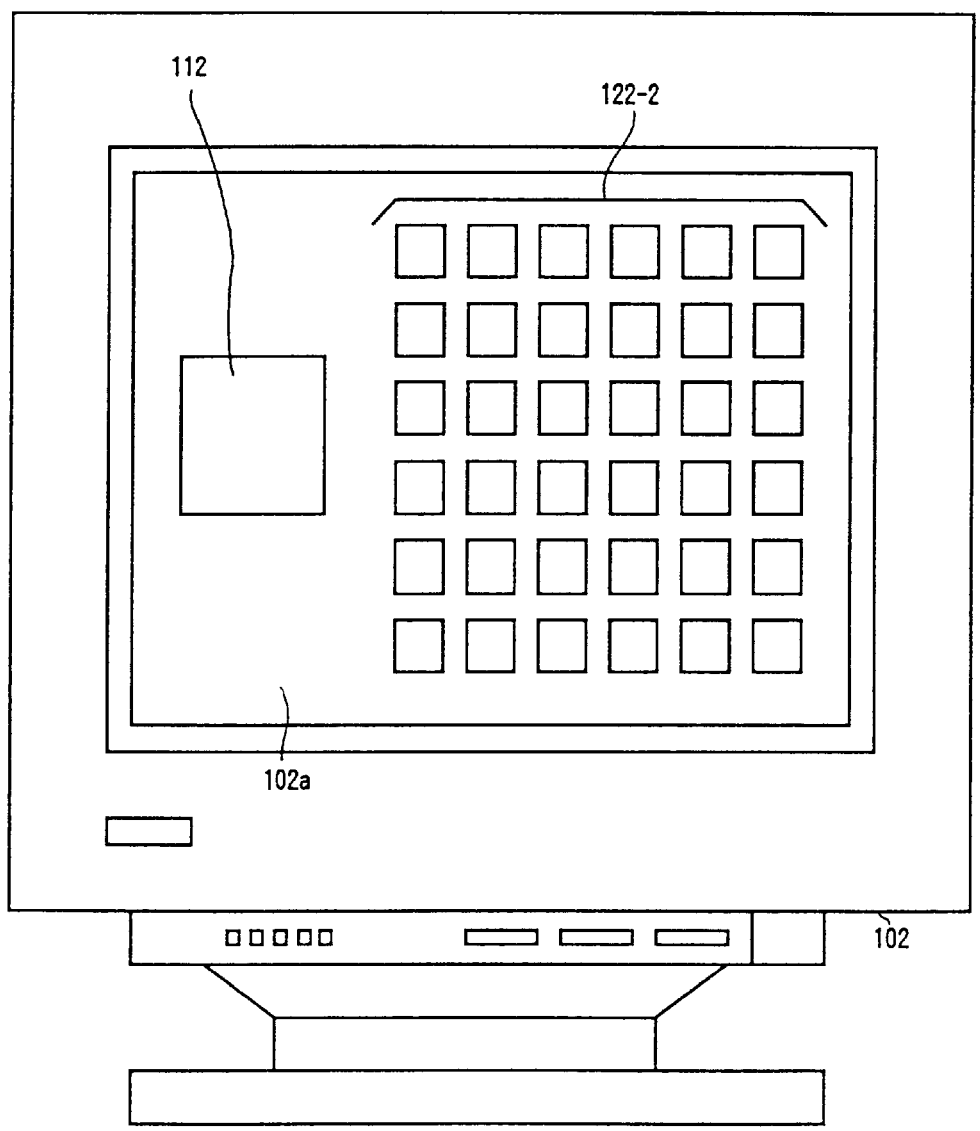
FIG. 11 is a diagram showing a case where white is displayed as the reference color and all colors necessary to obtain a display characteristic are displayed as the measuring colors on the display screen in the first embodiment.

FIG. 11 is a diagram showing a case where the step S1 displays, as the reference color, white which has a RGB value (R, G, B)=(255, 255, 255) in the region 112 on the display screen 102a, and displays, as the measuring colors, 9 kinds of red, 9 kinds of green, 9 kinds of blue, and 9 kinds of predetermined color (for example, gray) having different gradations with RGB values (R, G, B)=(0, 0, 0), . . . , (255, 255, 255) in a region 122-2 on the display screen 102a. In this case, the steps S2 and S3 measure the reference color white and the 9 kinds of measuring colors which are red, green, blue and predetermined color, so as to obtain the display characteristic of the display unit 102.

When comparing the display characteristic of the display unit 102 with a display characteristic of another display unit, measured results of the reference color obtained for the two display units can be compared.

Next, a description will be given of a second embodiment of the information processing apparatus according to the present invention. This embodiment of the information processing apparatus simultaneously displays a reference color and at least one measuring color which is to be measured on the display unit, based on a program which is stored in a second embodiment of the storage medium according to the present invention. The construction of this embodiment of the information processing apparatus may be the same as that of the first embodiment described above, and an illustration and description thereof will be omitted.

Figure 12:
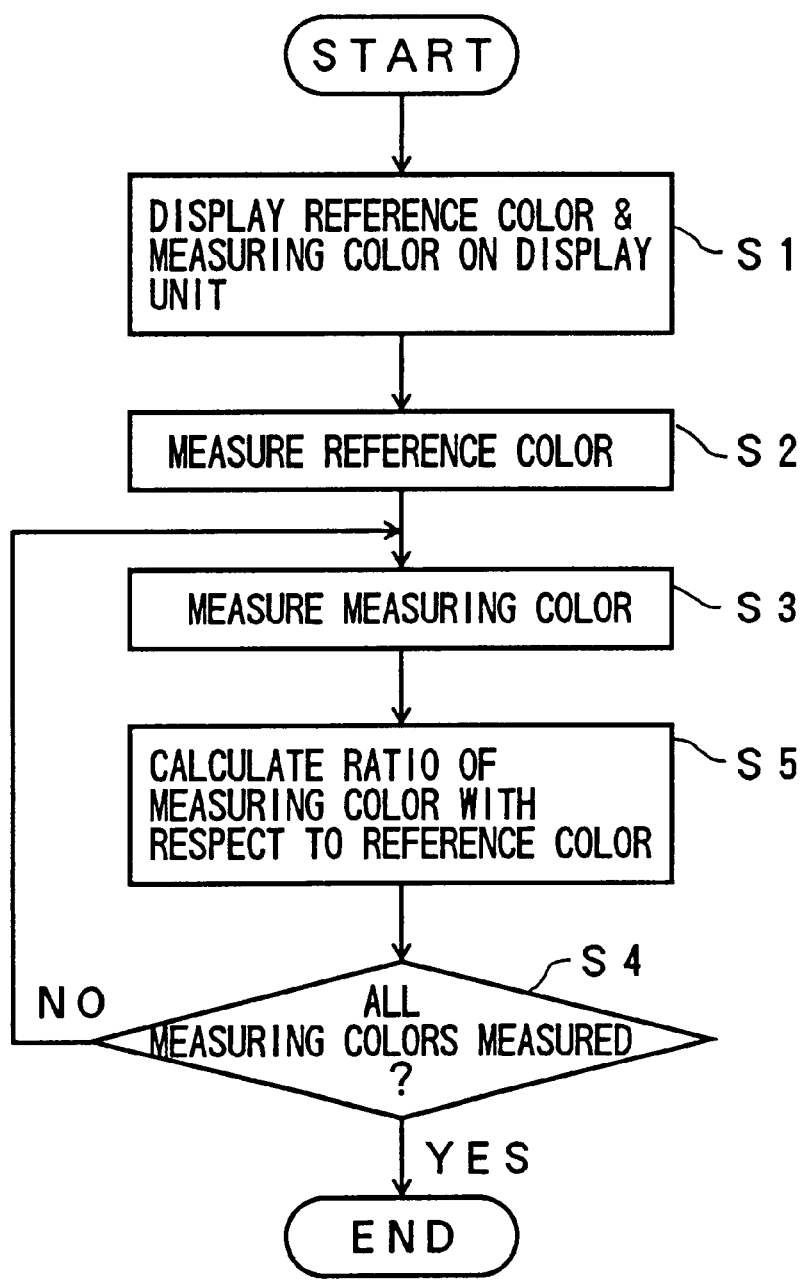
FIG. 12 is a flow chart for explaining the operation of the CPU in a second embodiment.

FIG. 12 is a flow chart for explaining the operation of the CPU 201 in the second embodiment. In FIG. 12, those steps which are the same as those corresponding steps in FIG. 8 are designated by the same reference numerals, and a description thereof will be omitted. This embodiment differs from the first embodiment described above, in that a step S5 is provided between the steps S3 and S4. The step S5 calculates a ratio of each measuring color which is measured with respect to the reference color, and stores each calculated ratio in the memory part 202, for example. In this embodiment, only the ratio of each measuring color which is measured with respect to the reference color is calculated and stored, and not the measured value of the color patch, such as the CIE XYZ value. Hence, the display characteristic of the display unit 102 is obtained from the calculated ratios. By storing only the ratios of the measuring values which are measured with respect to the reference color, it is possible to monitor the display characteristic of the display unit 102 even if the conditions such as the power control do not match, as long as the conditions of the color patch pattern itself are the same, and it is possible to accurately obtain the display characteristic.

In other words, it is possible to obtain the display characteristic of the display unit 102 by using the value of the measured value with respect to the reference color instead of the measured value obtained by the measurement, that is, a relative value in place of an absolute value.

FIGS. 13A, 13B, 14A and 14B are diagrams for explaining the ratio of each measuring color with respect to the reference color obtained in this embodiment, and show experimental data obtained by displaying all colors in one operation on the screen of the display unit as in the case shown in FIG. 11, for example.

FIG. 13A shows each of the measured colors, and measured values thereof, that is, luminance values, for a first display unit. FIG. 13B shows each of the measured colors, and ratios of values which are obtained by normalizing luminance values of the measured colors by a reference value which is the measured result of the reference color, with respect to the reference value.

FIG. 14A shows each of the measured colors, and measured values thereof, that is, luminance values, for a second display unit which is different from the first display unit. FIG. 14B shows each of the measured colors, and ratios of values which are obtained by normalizing luminance values of the measured colors by a reference value which is the measured result of the reference color, with respect to the reference value.

As may be seen from FIGS. 13A, 13B, 14A and 14B, the brightness of the displayed colors are completely different between the first display unit and the second display unit, due to the different type of display unit or the different display format used, and the measured values of each of the colors are completely different between the first and second display units. However, when the ratios of the values which are obtained by normalizing the luminance values of the measured colors by the reference value which is the measured result of the reference color, with respect to the reference value, are calculated as in this embodiment, it may be seen that the first and second display units show the same values. Accordingly, the first display unit having the values shown in FIGS. 13A and 13B and the second display unit having the values shown in FIGS. 14A and 14B have the same display characteristic, and it may be seen that the colors of the images can be reproduced in the same manner by the first and second display units.

Next, a description will be given of a third embodiment of the information processing apparatus according to the present invention. This embodiment of the information processing apparatus simultaneously displays a reference color and at least one measuring color which is to be measured on the display unit, based on a program which is stored in a third embodiment of the storage medium according to the present invention. The construction of this embodiment of the information processing apparatus may be the same as that of the first embodiment described above, and an illustration and description thereof will be omitted.

Figure 15:
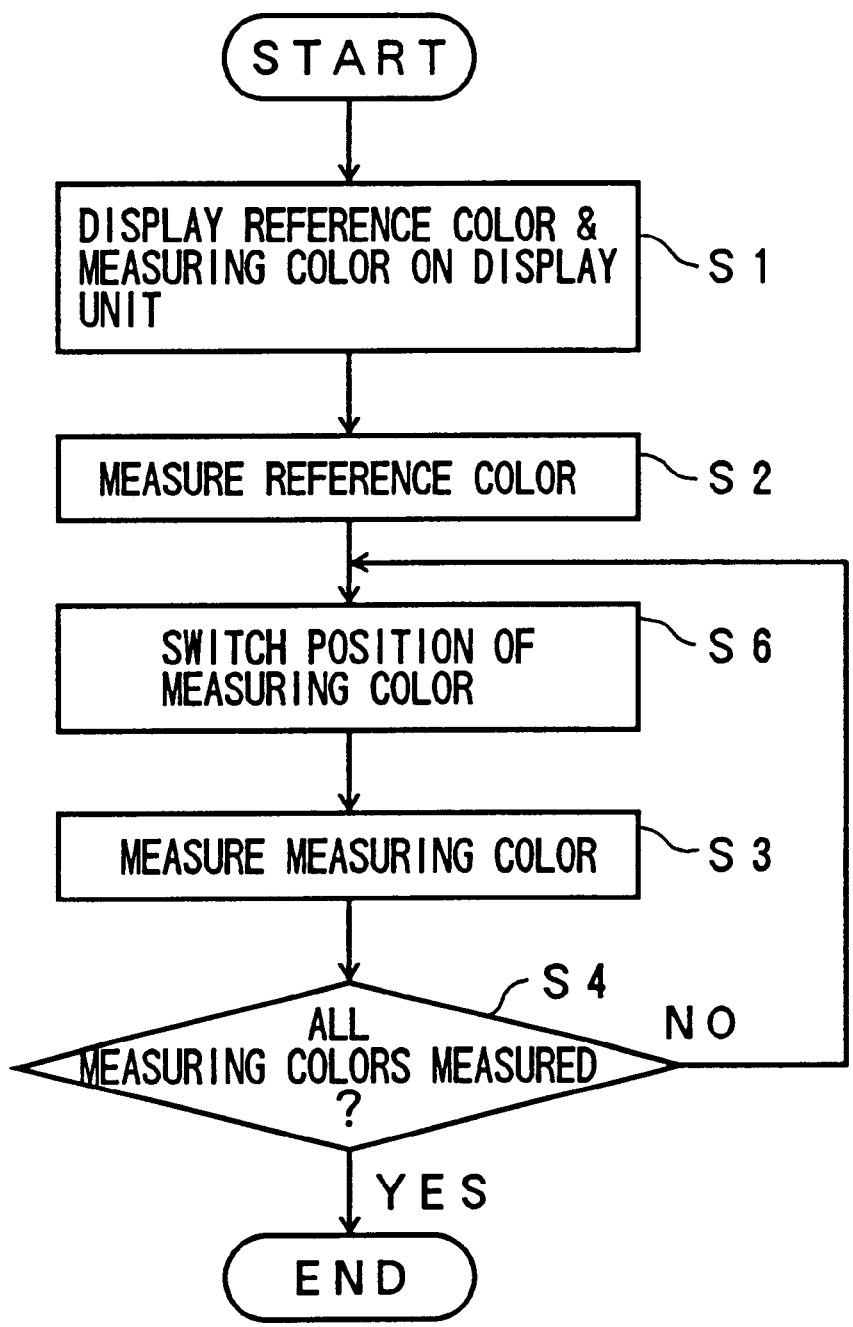
FIG. 15 is a flow chart for explaining the operation of the CPU in a third embodiment.

FIG. 15 is a flow chart for explaining the operation of the CPU 201 in the third embodiment. In FIG. 15, those steps which are the same as those corresponding steps in FIG. 8 are designated by the same reference numerals, and a description thereof will be omitted. This embodiment differs from the first embodiment described above, in that a step S6 is provided between the steps S2 and S3. The step S6 switches a display position of the measuring color on the display screen 102a, so that the measuring color at the switched display position is measured. If the decision result in the step S4 is NO, the process returns to the step S6.

Figure 16:
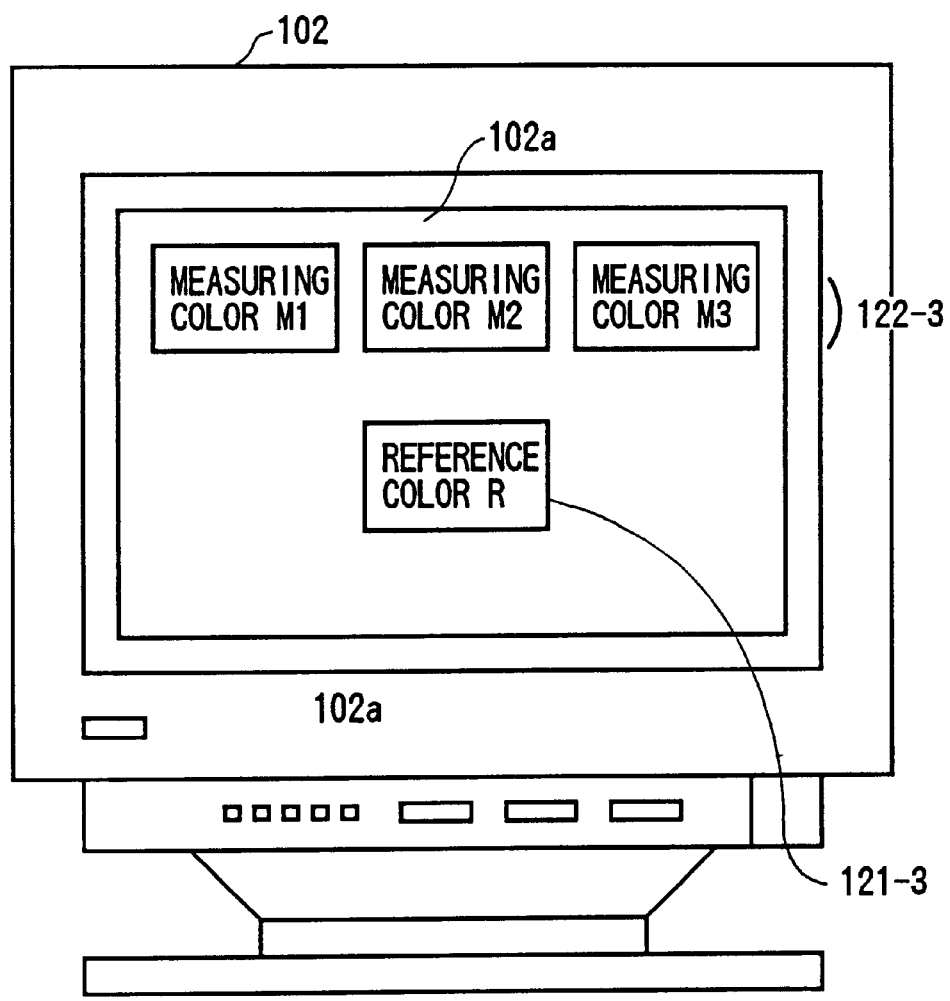
FIG. 16 is a diagram for explaining the switching of display positions in the third embodiment.
Figure 17:
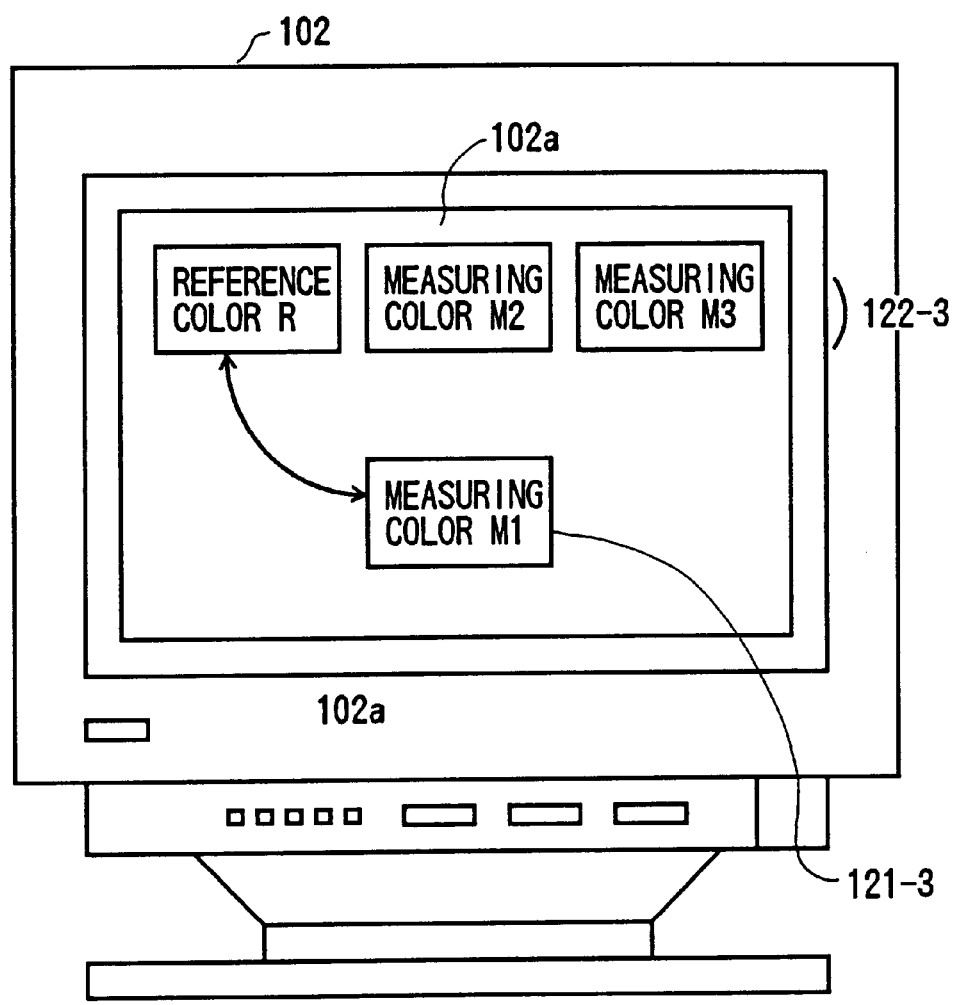
FIG. 17 is a diagram for explaining the switching of the display positions in the third embodiment.

FIGS. 16 and 17 are diagrams for explaining the switching of the display position. Here, it is assumed for the sake of convenience that the sizes of the color patches of the reference color and the measuring color are the same. When measuring the reference color in the step S2, the reference color R is displayed in a region 121-3 and measuring colors M1 through M3 are displayed in a region 122-3 as shown in FIG. 16. When the display position is switched in the step S6, the display position of the reference color R is switched into the region 122-3 as indicated by an arrow in FIG. 17, and the display position of the measuring color M1 which is to be measured first is switched into the region 121-3. Accordingly, when measuring the measuring color M1 in the step S3, the measuring color M1 is displayed within the region 121-3 as shown in FIG. 17. By displaying each measuring color which is to be measured in the same region 121-3 on the display screen 102a, it is possible to accurately obtain the display characteristic of the display unit 102 even in a case where an in-plane inconsistency is generated and the display characteristic of the display unit 102 differs depending on the position on the display screen 102a.

In addition, it is desirable that the area of the reference color R and the area of each of the measuring colors M1 through M3 which are respectively displayed within the region 121-3, are identical. By setting the display areas of each of the colors identical to each other, it becomes possible to accurately obtain the display characteristic of the display unit 102, even when the conditions such as the power control do not match. In other words, if the display area of the measuring color were changed when the display region is moved, the total luminance of the screen would change by the power control and the measuring conditions would change. But it is possible to prevent the power control from being carried out, by making the display area of each of the measuring colors the same before and after the display region is moved. That is, if the display area of a specific color changes, the power consumption of the entire picture would make a corresponding change, and the power control would be carried out. It should be noted that, normally, the power control is not carried out for each color displayed on the screen, but is carried out by taking into consideration the power consumption of the entire picture at that point in time.

Figure 1:
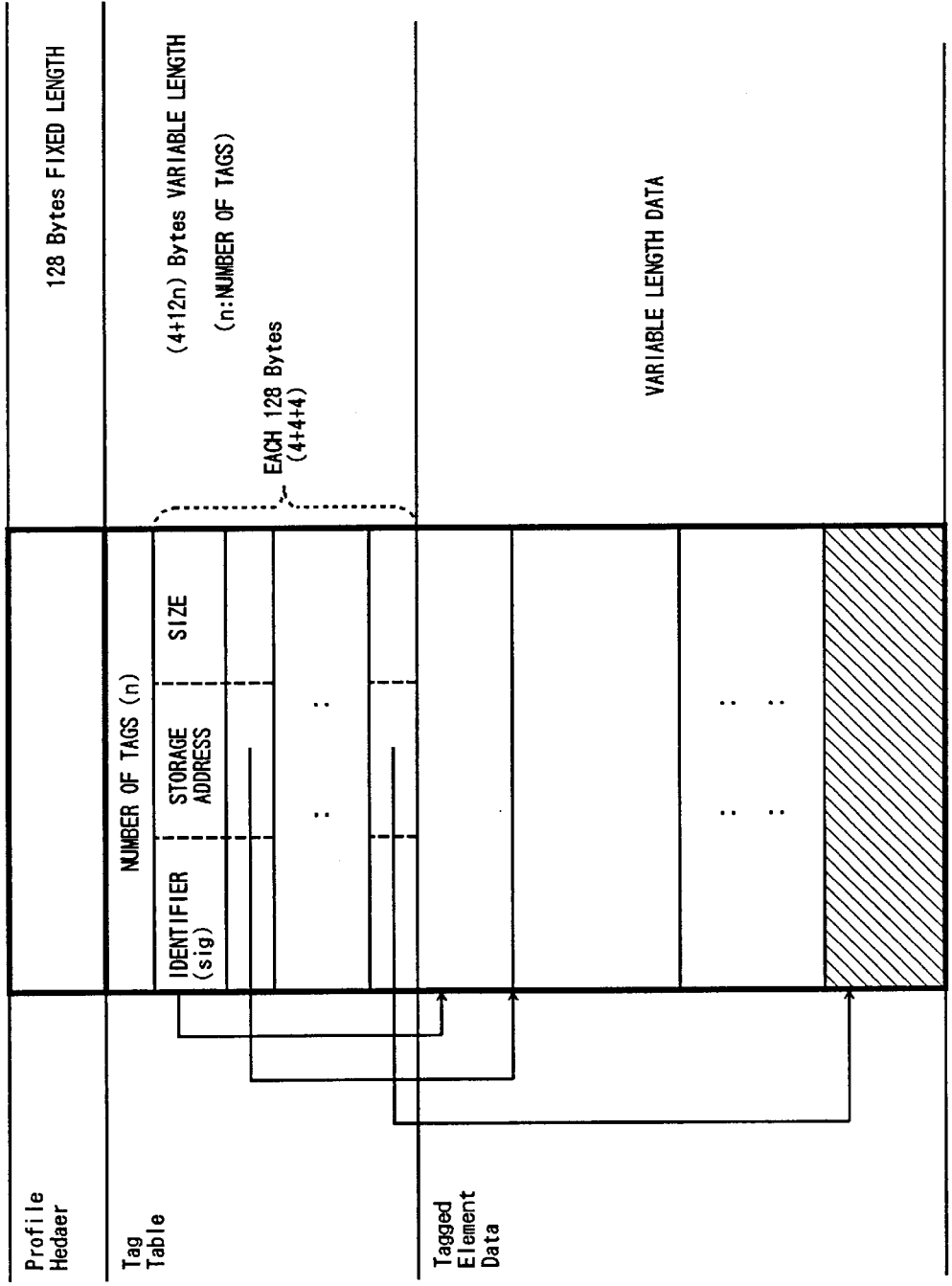
FIG. 1 is a diagram for explaining the structure of an ICC profile.
Figure 2:
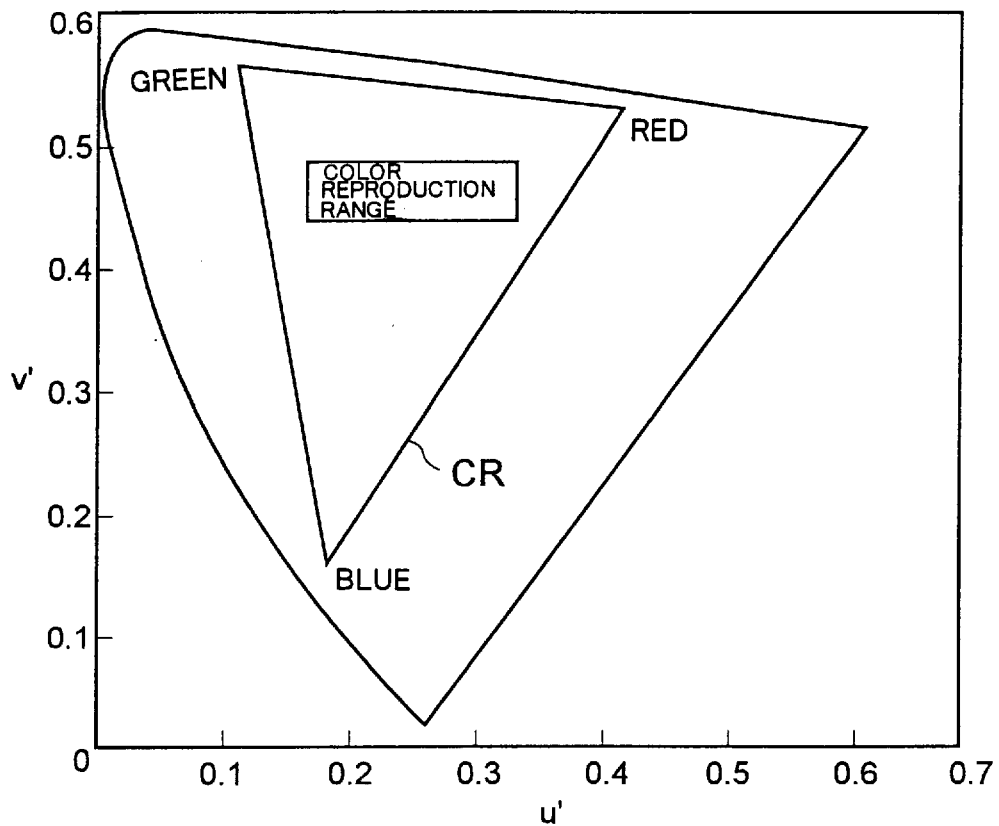
FIG. 2 is a diagram for explaining a color reproduction range.
Figure 3:
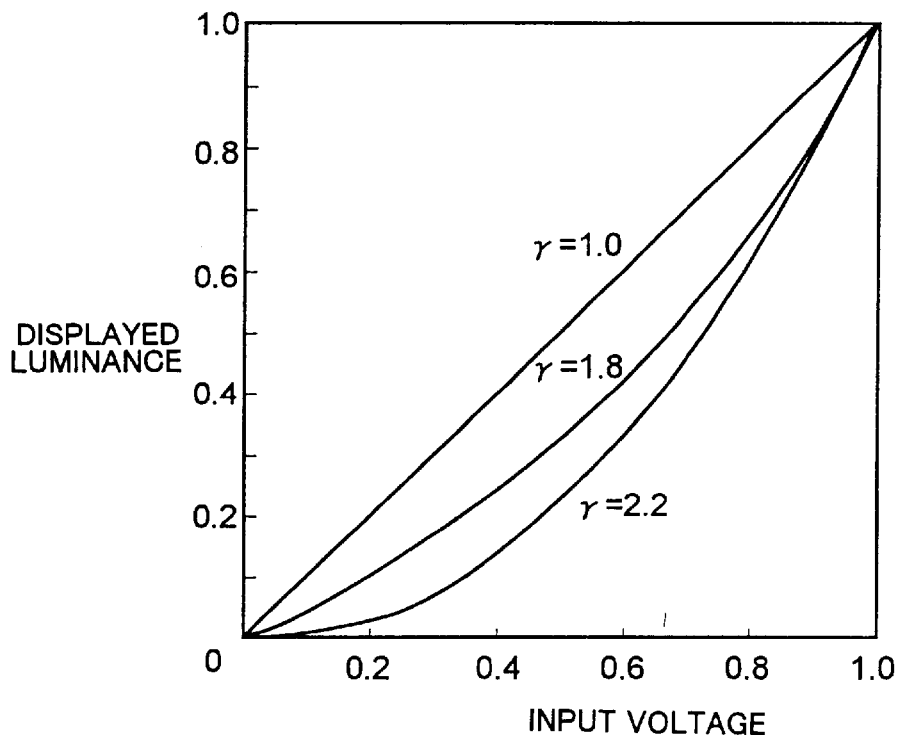
FIG. 3 is a diagram for explaining γcharacteristics.

As described above, it is possible to know the display characteristic of the display unit from the CIE XYZ values of the colors R, G and B shown in FIG. 2 when the colors R, G, and B respectively have the maximum values Rmax, Gmax and Bmax, and from the input/output characteristics of the colors R, G and B shown in FIG. 3, that is, the γ-characteristics. Accordingly, in order to create the profile of the display unit, it is necessary to know the wtpt value, the CIE XYZ values of the colors R, G and B when the colors R, G, and B respectively have the maximum values Rmax, Gmax and Bmax, and the γ-characteristics of the colors R, G, and B.

When creating the profile of the display unit, it is possible to consider measurements at the following points. It is possible to set n, a number of measurements made, to 1 or greater, and change the value n for each of the colors R, G and B. Particularly in the case of the γ-characteristic, the larger the number of measuring points the more accurate the measured results become.

point where RGB value of the maximum light emission color for red is RGB value (R, G, B)=(255, 0, 0)

point where RGB value of the maximum light emission color for green is RGB value (R, G, B)=(0, 255, 0)

point where RGB value of the maximum light emission color for blue is RGB value (R, G, B)=(0, 0, 255)

point where RGB value of the maximum light emission color for white is RGB value (R, G, B)=(255, 255, 255)

n points where RGB value of halftone color for red is RGB value (R, G, B)=(r1, 0, 0), (r2, 0, 0), . . . , (rn, 0, 0)

n points where RGB value of halftone color for green is RGB value (R, G, B)=(0, g1, 0), (0, g2, 0), . . . , (0, gn, 0)

n points where RGB value of halftone color for blue is RGB value (R, G, B)=(0, 0, b), (0, 0, b2), . . . , (0, 0, bn)

In the display unit which carries out the power control, each of the colors displayed on the display unit cannot be measured under the same conditions. Consequently, the CIE XYZ values, for example, cannot be stored as they are in the profile, since the CIE XYZ values are values which are directly obtained by measuring the colors. Hence, a description will hereinafter be given of an embodiment which can create an accurate profile, even with respect to the display unit which carries out the power control or the like.

Next, a description will be given of a fourth embodiment of the information processing apparatus according to the present invention. This embodiment of the information processing apparatus simultaneously displays a reference color and at least one measuring color which is to be measured on the display unit, based on a program which is stored in a fourth embodiment of the storage medium according to the present invention, and creates a profile of the display unit by an embodiment of a profile data creating method according to the present invention by measuring the reference color and the measuring color which are displayed. The construction of this embodiment of the information processing apparatus may be the same as that of the first embodiment described above, and an illustration and description thereof will be omitted.

Figure 18:
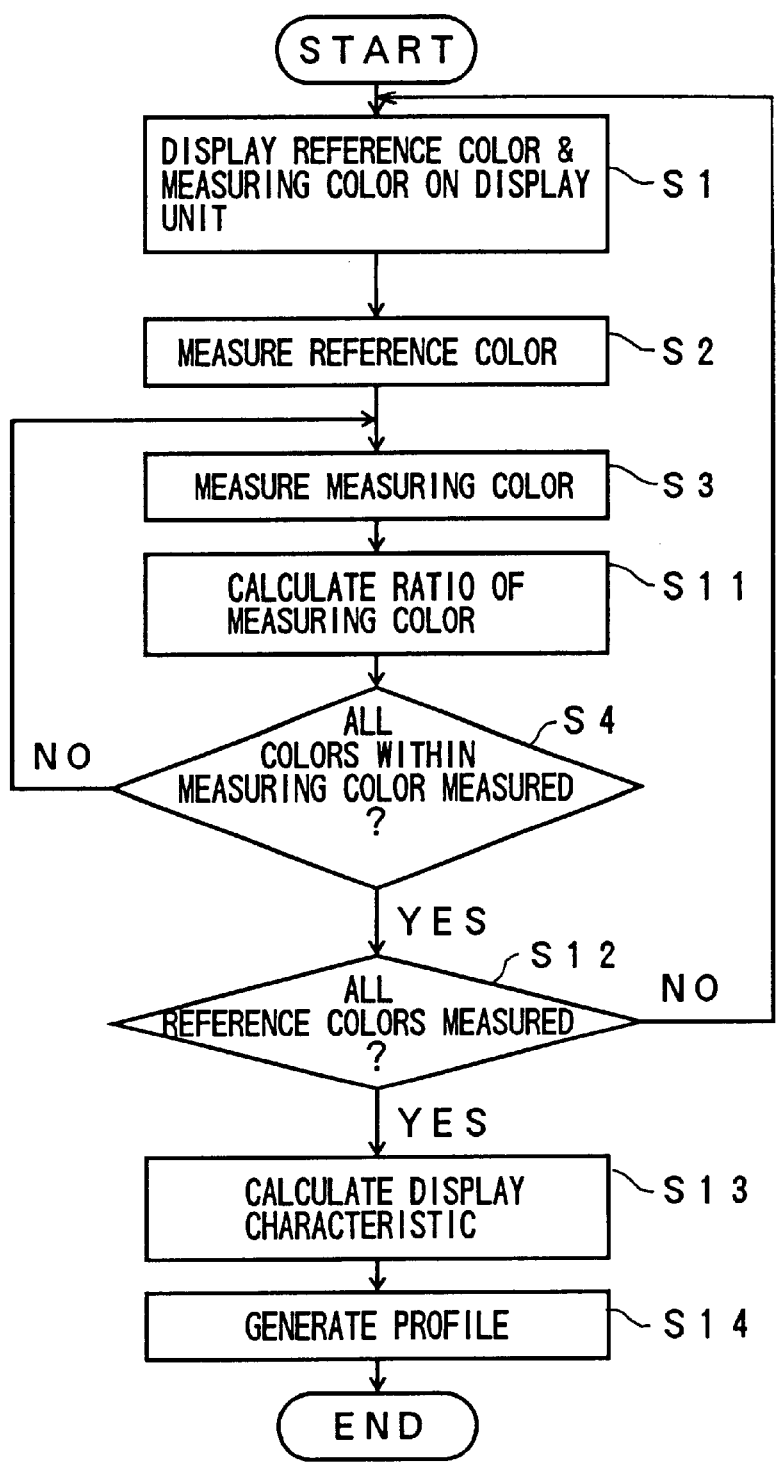
FIG. 18 is a flow chart for explaining the operation of the CPU in a fourth embodiment.

FIG. 18 is a flow chart for explaining the operation of the CPU 201 in the fourth embodiment. In FIG. 18, those steps which are the same as those corresponding steps in FIG. 8 are designated by the same reference numerals, and a description thereof will be omitted. This embodiment differs from the first embodiment described above, in that a step S11 is provided between the steps S3 and S4, and that steps S12 through S14 are provided after the step S4.

The steps S2 and S3 measure the reference color and the measuring color which are displayed as shown in FIGS. 9 and 10, and store the measured values in the memory part 202. The step S11 calculates a ratio of the measured value of each measuring color with respect to the measured value of the reference color, and stores the calculated ratio in the memory part 202. For example, the measurements are made at the (3n+4) points described above, and the ratio of the measured value of each measuring color with respect to the measured value of the reference color is calculated. If the decision result in the step S4 is YES, the step S12 decides whether or not all of the reference colors are measured. The process returns to the step S2 if the decision result in the step S12 is NO. In other words, when a plurality of combinations of the reference color and the measuring colors exist, the above described steps S1 through S4 are repeated for all such combinations. If the decision result in the step S12 is YES, the step S13 calculates and stores in the memory part 202 the display characteristic of the display unit 102, that is, the data to be stored in the profile of the display unit 102, based on the ratios calculated in the step S11. The step S14 creates the profile of the display unit 102 based on the data calculated in the step S13, and stores the created profile in the memory part 202. The process ends after the step S14. By carrying out the series of operations described above, it is possible to create the profile of the display unit 102, without being affected by the power control or the like of the display unit 102.

Next, a description will be given of a fifth embodiment of the information processing apparatus according to the present invention. This embodiment of the information processing apparatus simultaneously displays a reference color and at least one measuring color which is to be measured on the display unit, based on a program which is stored in a fifth embodiment of the storage medium according to the present invention, and creates a profile of the display unit by measuring the reference color and the measuring color which are displayed. The construction of this embodiment of the information processing apparatus may be the same as that of the first embodiment described above, and an illustration and description thereof will be omitted.

Figure 19:
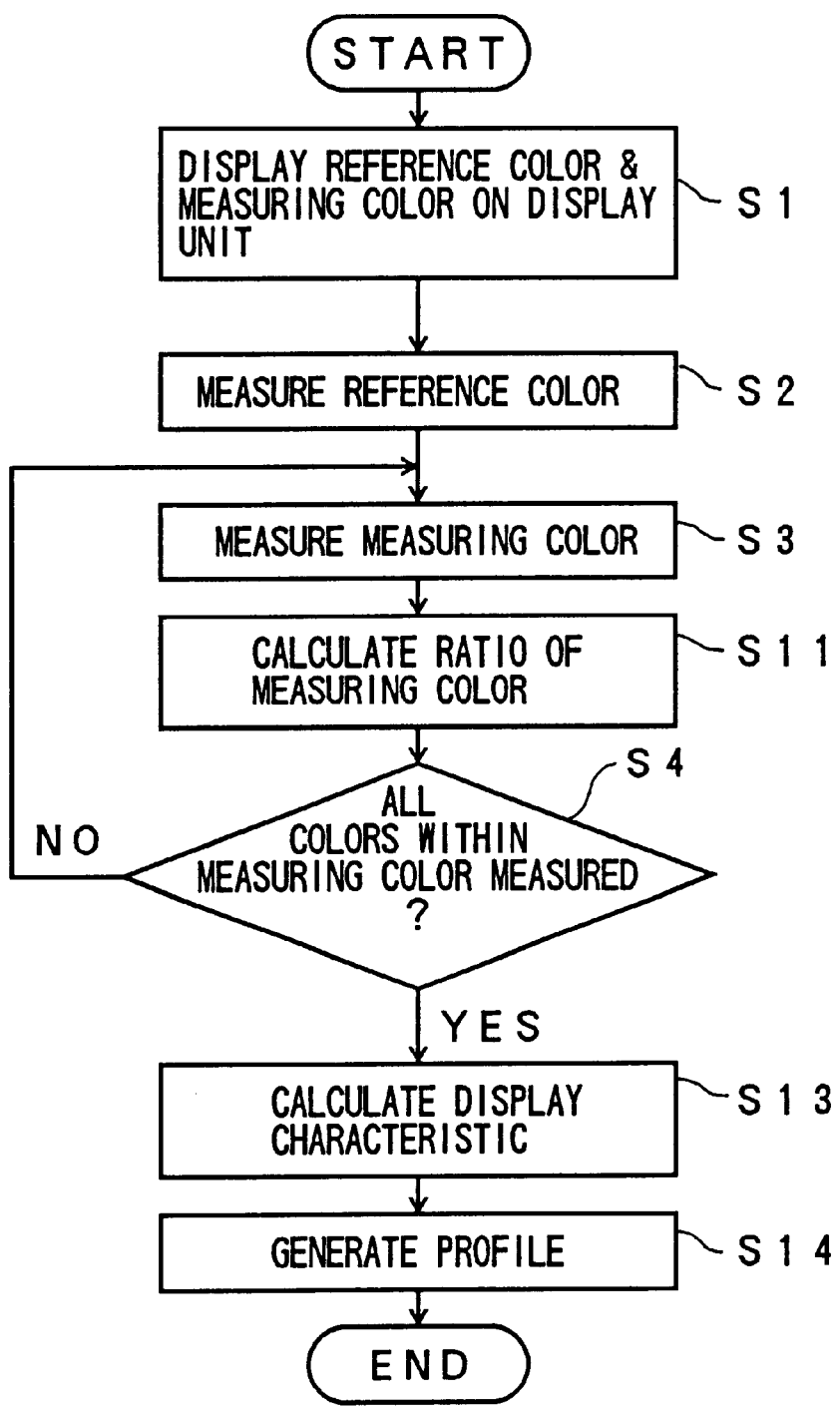
FIG. 19 is a flow chart for explaining the operation of the CPU in a fifth embodiment.

FIG. 19 is a flow chart for explaining the operation of the CPU 201 in the fifth embodiment. In FIG. 19, those steps which are the same as those corresponding steps in FIGS. 8 and 18 are designated by the same reference numerals, and a description thereof will be omitted. This embodiment differs from the first embodiment described above, in that the step S11 is provided between the steps S3 and S4, and that the steps S13 and S14 are provided after the step S4.

The steps S2 and S3 measure all of the reference color and the measuring colors which are necessary to create the profile of the display unit 102 and are displayed as shown in FIG. 11, and store the measured values in the memory part 202. The step S11 calculates a ratio of the measured value of each measuring color with respect to the measured value of the reference color, and stores the calculated ratio in the memory part 202. In this embodiment, all of the colors necessary to create the profile are displayed on the same display screen 102a, and thus, it is unnecessary to use a plurality of reference colors. Hence, if the decision result in the step S4 is YES, the processes of the steps S13 and S14 are carried out, and the process ends.

Next, a description will be given of a sixth embodiment of the information processing apparatus according to the present invention. This embodiment of the information processing apparatus simultaneously displays a reference color and at least one measuring color which is to be measured on the display unit, based on a program which is stored in a sixth embodiment of the storage medium according to the present invention, and creates a profile of the display unit by measuring the reference color and the measuring color which are displayed. The construction of this embodiment of the information processing apparatus may be the same as that of the first embodiment described above, and an illustration and description thereof will be omitted.

Figure 20:
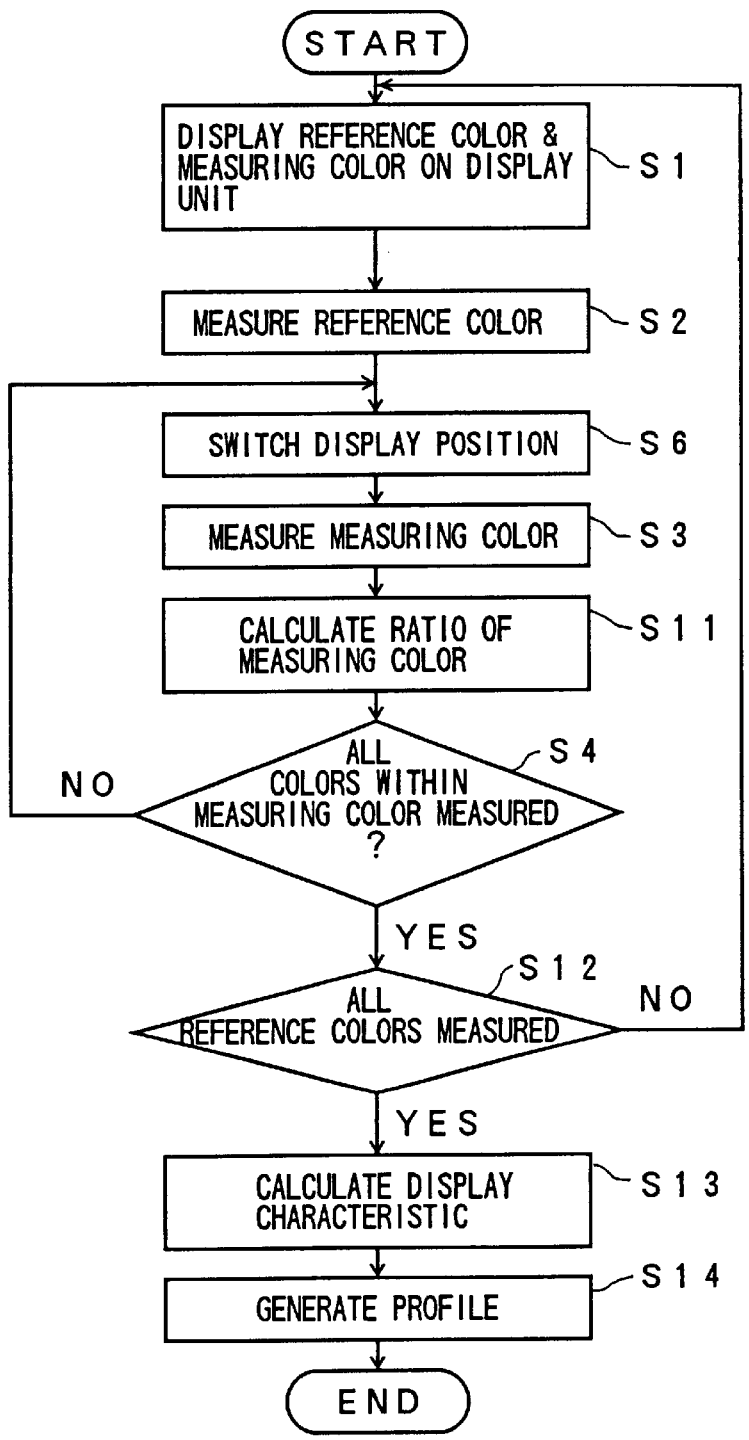
FIG. 20 is a flow chart for explaining the operation of the CPU in a sixth embodiment.

FIG. 20 is a flow chart for explaining the operation of the CPU 201 in the sixth embodiment. In FIG. 20, those steps which are the same as those corresponding steps in FIGS. 15 and 18 are designated by the same reference numerals, and a description thereof will be omitted. This embodiment differs from the third embodiment described above, in that the step S11 is provided between the steps S3 and S4, and that the steps S12 through S14 are provided after the step S4.

The steps S2 and S3 measure the reference color and the measuring color which are switched and displayed as shown in FIGS. 16 and 17, and store the measured values in the memory part 202. The step S11 calculates a ratio of the measured value of each measuring color with respect to the measured value of the reference color, and stores the calculated ratio in the memory part 202. Other processes are the same as those of the fourth embodiment described above.

In a case where the in-plane inconsistency exists in the display unit 102 and the measurements are made at a plurality of positions on the display screen 102a, the effects of the in-plane inconsistency may be reflected to the created profile of the display unit 102 and deteriorate the accuracy of the profile. But according to this embodiment, the reference color and each measuring color are displayed and measured at the same position on the display screen 102a, so that it is possible to create a highly accurate profile which is unaffected by the in-plane inconsistency.

In the fourth through sixth embodiments described above, it is assumed for the sake of convenience that the created profile is stored in the memory part 202. However, the storage location of the created profile is not limited to the memory part 202, and the created profile may be stored in the disk 110 within the disk drive 203, a hard disk within the hard disc drive 204, or in other storage means.

In addition, the arrangement and the display area of the reference color and the measuring colors displayed on the display screen 102a of the display unit 102 are of course not limited to those of the embodiments described above.

Next, a description will be given of a seventh embodiment of the information processing apparatus according to the present invention. FIG. 21 is a functional block diagram showing the construction within the main body part 101 of the computer system 100 in this embodiment.

Figure 22:
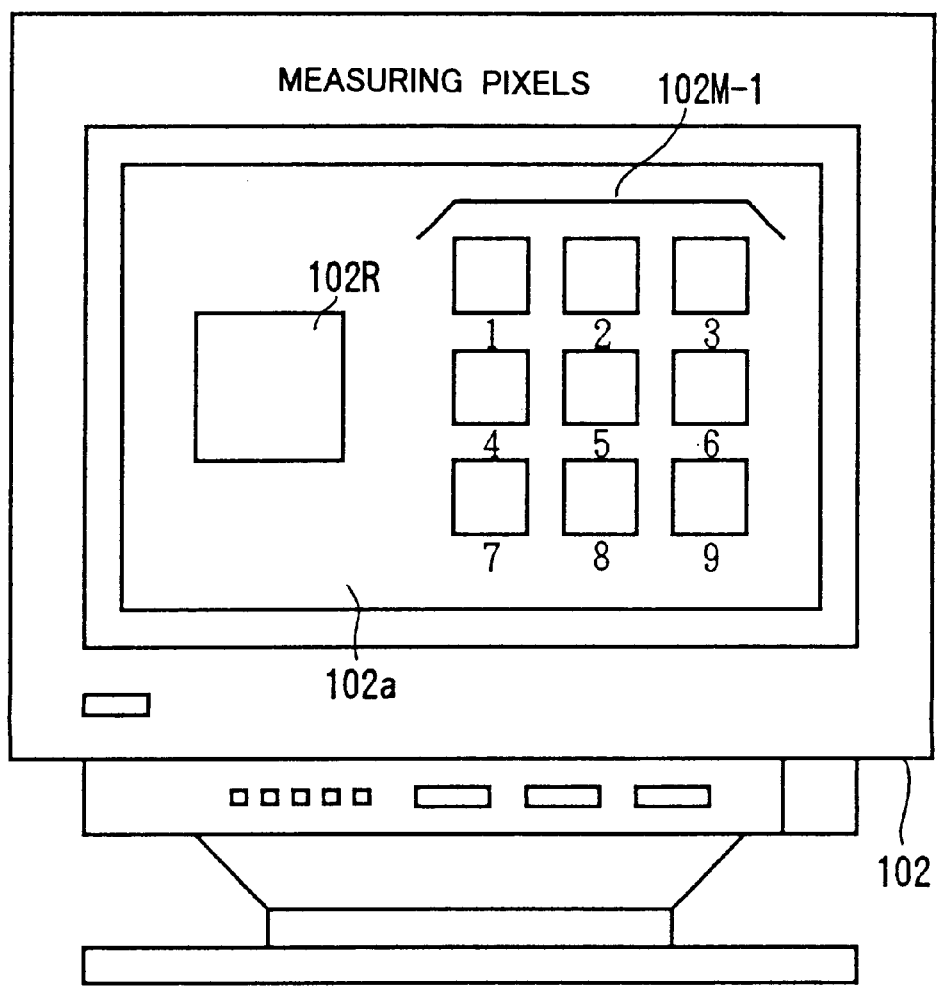
FIG. 22 is a diagram for explaining the operation of the seventh embodiment.
Figure 23:
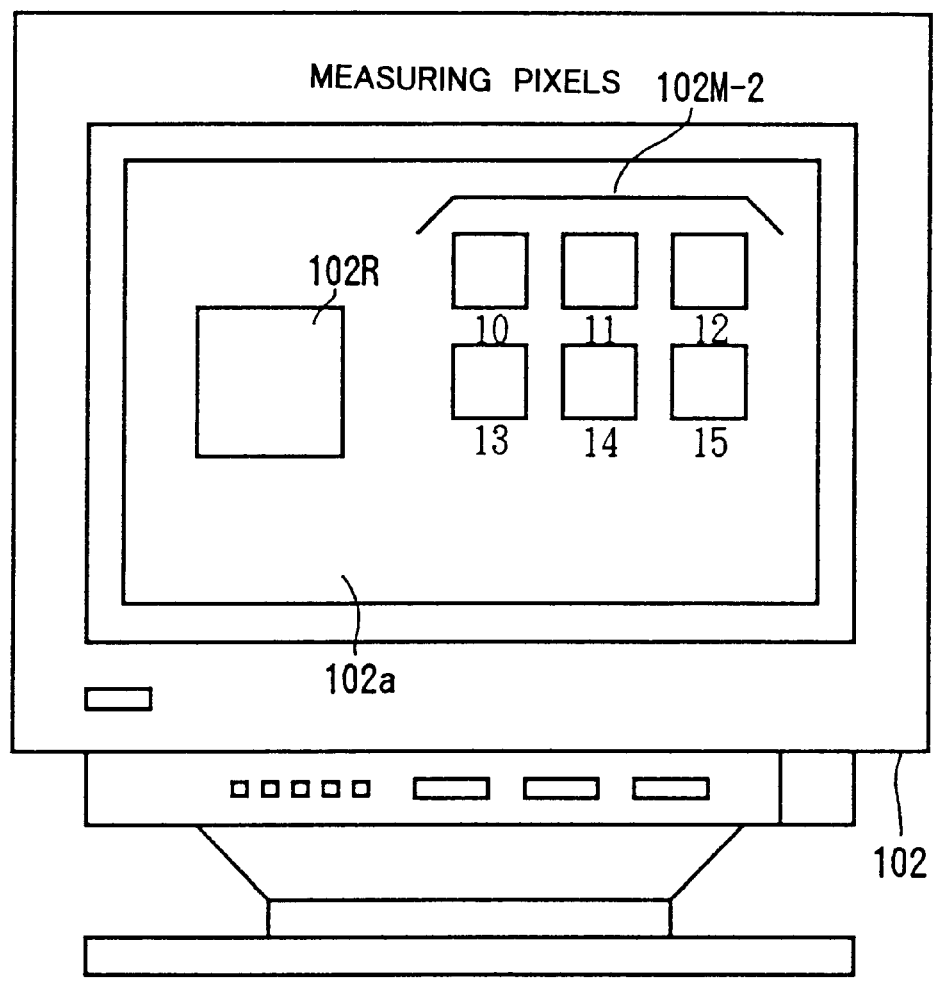
FIG. 23 is a diagram for explaining the operation of the seventh embodiment.

In FIG. 21, a reference color patch storing part 1 stores a reference color patch 102R shown in FIG. 22 or FIG. 23 which is made up solely of one color. A measuring color patch storing part 2 stores a measuring color patch 102M-1 shown in FIG. 22 which is made up of a plurality of colors or, stores a measuring color patch 102M-2 shown in FIG. 23 which is made up of a plurality of colors. In FIG. 22, the measuring color patch 102M-1 is made up of 9 colors C1 through C9. On the other hand, the measuring color patch 102M-2 shown in FIG. 23 is made up of 6 colors C10 through C15.

A color patch display part 3 simultaneously displays the reference color patch 102R and the measuring color patch 102M-1 or 102M-2 on the display screen 102a of the display unit 102. A measuring part 4 controls the color measuring device 115, and measures the colors displayed on the display screen 102a. In the case shown in FIG. 22, the color of the reference color patch 102R, and the colors C1, C2, . . . , C9 within the measuring color patch 102M-1 are successively measured in this order. On the other hand, in the case shown in FIG. 23, the color of the reference color patch 102R, and the colors C10, C11, . . . , C15 within the measuring color patch 102M-2 are successively measured in this order. A measured result of the reference color patch 102R is stored in a reference value storing part 5, and measured results of the measuring color patch 102M-1 or 102M-2 are temporarily stored in a measured color value storing part 6.

After measuring the measuring color patch 102M-1 or 102M-2, the measured value of the reference color patch 102R stored in the reference value storing part 5, and the measured values of each of the colors within the measuring color patch 102M-1 or 102M-2 stored in the measured value storing part 6, are supplied to a measured color ratio calculating part 7. The measured color ratio calculating part 7 calculates a ratio (measured ratio) of the measuring color patch 102M-1 or 102M-2 with respect to the reference color patch 102R, and stores the calculated ratio in the measured value storing part 6. If a color which is to be measured still remains after measuring the measuring color patch 102M-1 or 102M-2, a new measuring color patch and the reference color patch 102R identical to that used previously are displayed on the display screen 102a of the display unit 102.

A reference value update part 8 instructs display of a new color patch, and instructs the reference value storing part 5 to discard the measured value of the previous reference color patch 102R and to store a new measured result by sending a reference value update signal. Every time a new measuring color patch is displayed, the reference value storing part 5 stores a re-measured result of the reference color patch in response to the reference value update signal.

After all of the colors necessary to create the profile are measured, the measured ratios of all of the colors necessary to create the profile are supplied to a profile creating part 9. The profile creating part 9 creates the profile of the display unit 102 based on the received data. By carrying out the above described process, it is possible to create the profile even with respect to a display unit which cannot be measured under the same measuring conditions due to the power control or the like carried out by the display unit.

The reference color patch storing part 1, the measuring color patch storing part 2, the reference value storing part 5, and the measured value storing part 6 can be formed by the memory part 202, the disk drive 203 and/or the hard disk drive 204 shown in FIG. 7. On the other hand, the color chi display part 3, the measuring part 4, the measured color ratio calculating part 7, the reference value update part 8, and the profile creating part 9 can be formed by the CPU 201 shown in FIG. 7.

Figure 24:
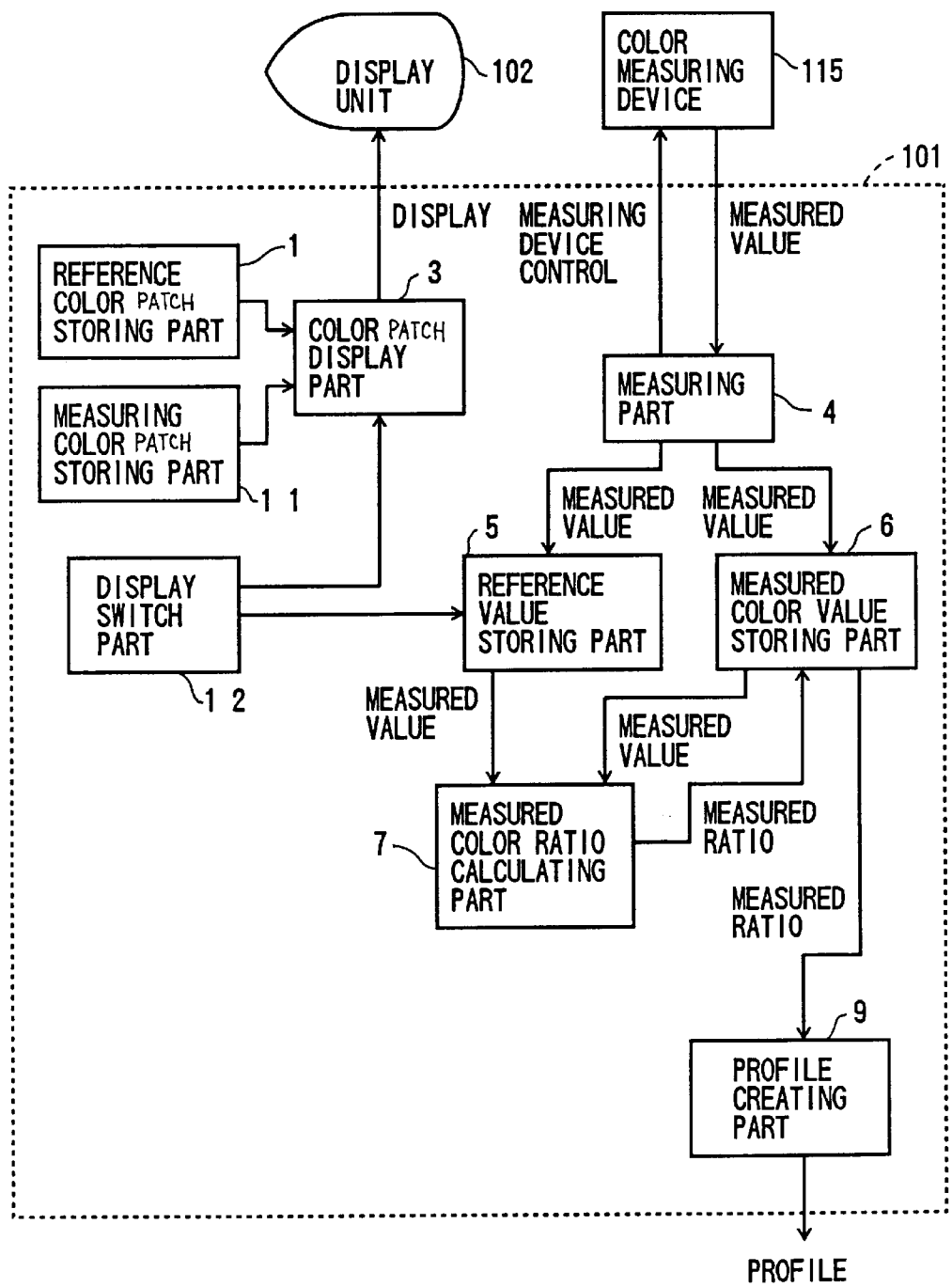
FIG. 24 is a functional block diagram showing the construction within the main body part of the computer system in an eighth embodiment.

Next, a description will be given of an eighth embodiment of the information processing apparatus according to the present invention. FIG. 24 is a functional block diagram showing the construction within the main body part 101 of the computer system 100 in this embodiment. In FIG. 24, those parts which are the same as those corresponding parts in FIG. 21 are designated by the same reference numerals, and a description thereof will be omitted.

Figure 25:
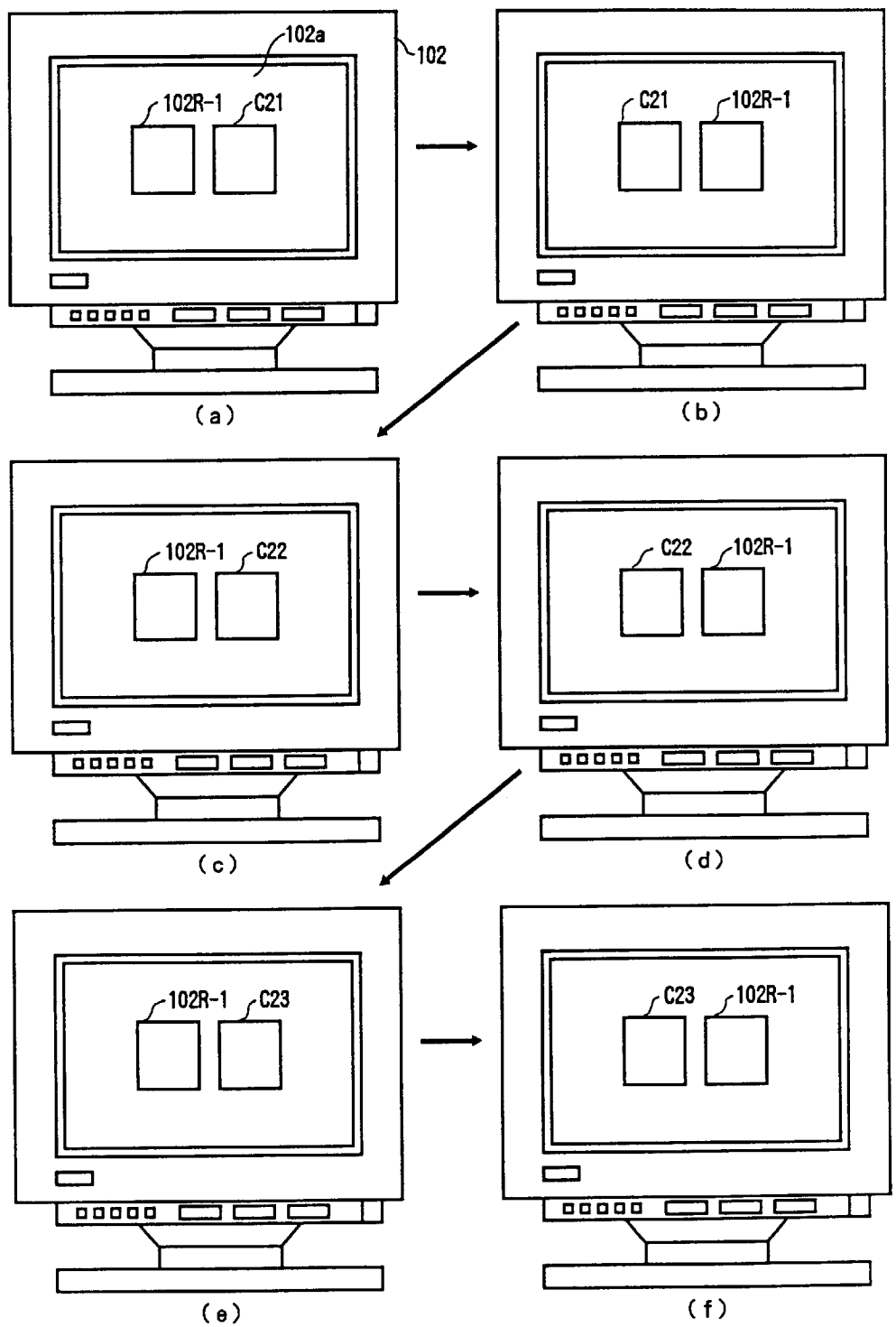
FIG. 25 is a diagram for explaining the operation of the eighth embodiment.

In this embodiment, a display switch part 12 is provided in place of the reference value update part 8 shown in FIG. 21. This display switch part 12 can be formed by the CPU 201 shown in FIG. 7. The display switch part 12 makes a display according to a flow shown in FIGS. 25(*a*) through (*f*). First, as shown in FIG. 25(*a*), a reference color patch 102R-1 and a color C21 are displayed on the display screen 102a, and the reference color patch 102R-1 is measured. Next, as shown in FIG. 25(*b*), display positions of the reference color patch 102R-1 and the color C21 are switched, and the color C21 is measured at the same measuring position as in FIG. 25(*a*). Then, as shown in FIG. 25(*c*), the reference color patch 102R-1 and a color C22 are displayed on the display screen 102a, and the reference color patch 102R-1 is measured. Further, as shown in FIG. 25(*d*), the display positions of the reference color patch 102R-1 and the color C22 are switched, and the color C22 is measured at the same measuring position as in FIG. 25(*c*). Next, as shown in FIG. 25(*e*), the reference color patch 102R-1 and a color C23 are displayed on the display screen 102a, and the reference color patch 102R-1 is measured. Then, as shown in FIG. 25(*f*), the display positions of the reference color patch 102R-1 and the color C23 are switched, and the color C23 is measured at the same measuring position as in FIG. 25(*e*).

In this embodiment, the measuring position is fixed, and the display positions of the color patchs are successively switched. An in-plane inconsistency may be generated and the display characteristic of the display unit 102 may differ depending on the position on the display screen 102a. Bu according to this embodiment, it is possible to carry out the measurements without being affected by the in-plane inconsistency of the display unit 102 even if the measurements cannot be made under the same conditions due to the power control or the like carried out by the display unit 102. As a result, this embodiment can create a highly accurate profile of the display unit 102.

Figure 26:
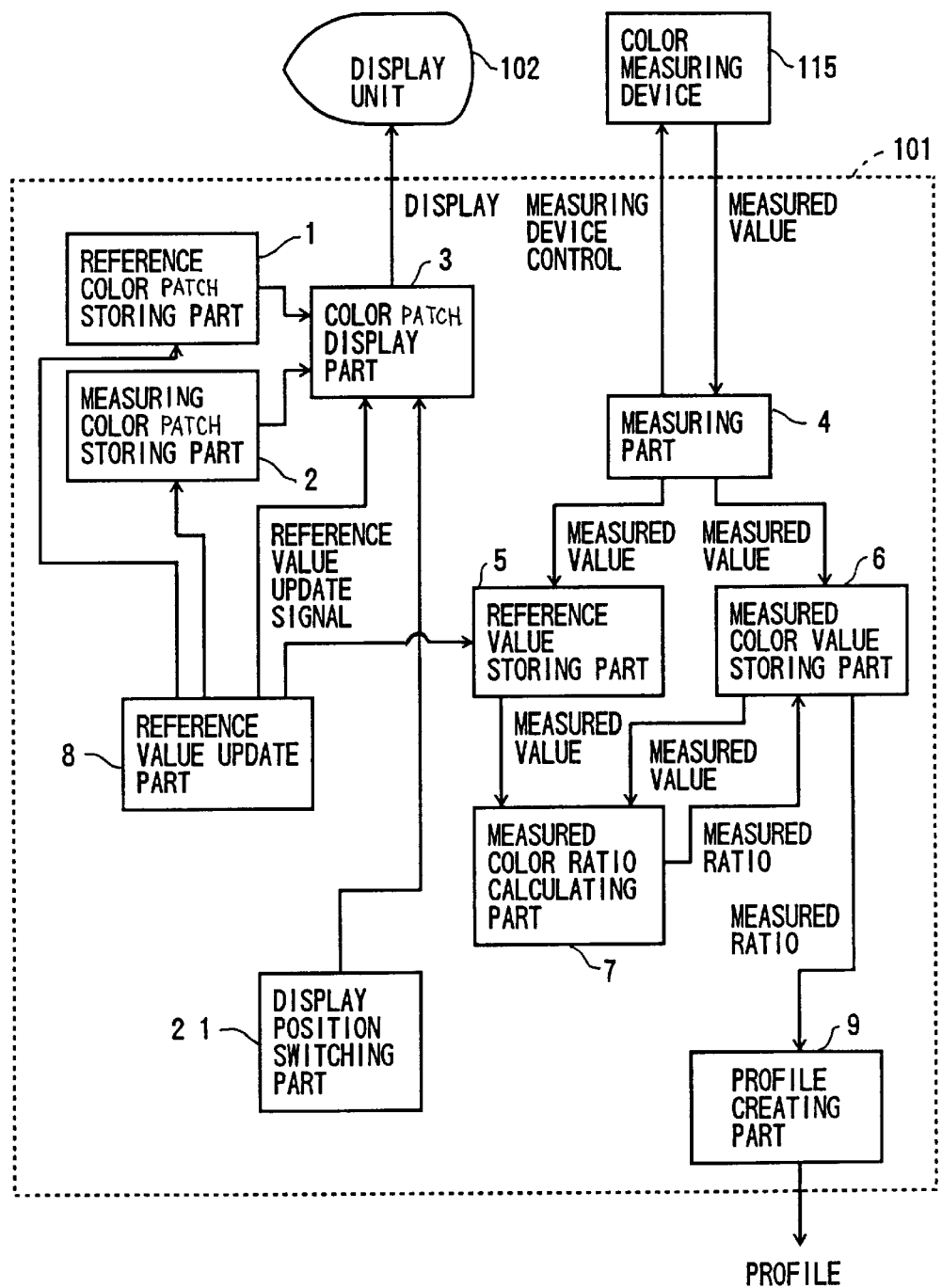
FIG. 26 is a functional block diagram showing the construction within the main body part of the computer system in a ninth embodiment.
Figure 27:
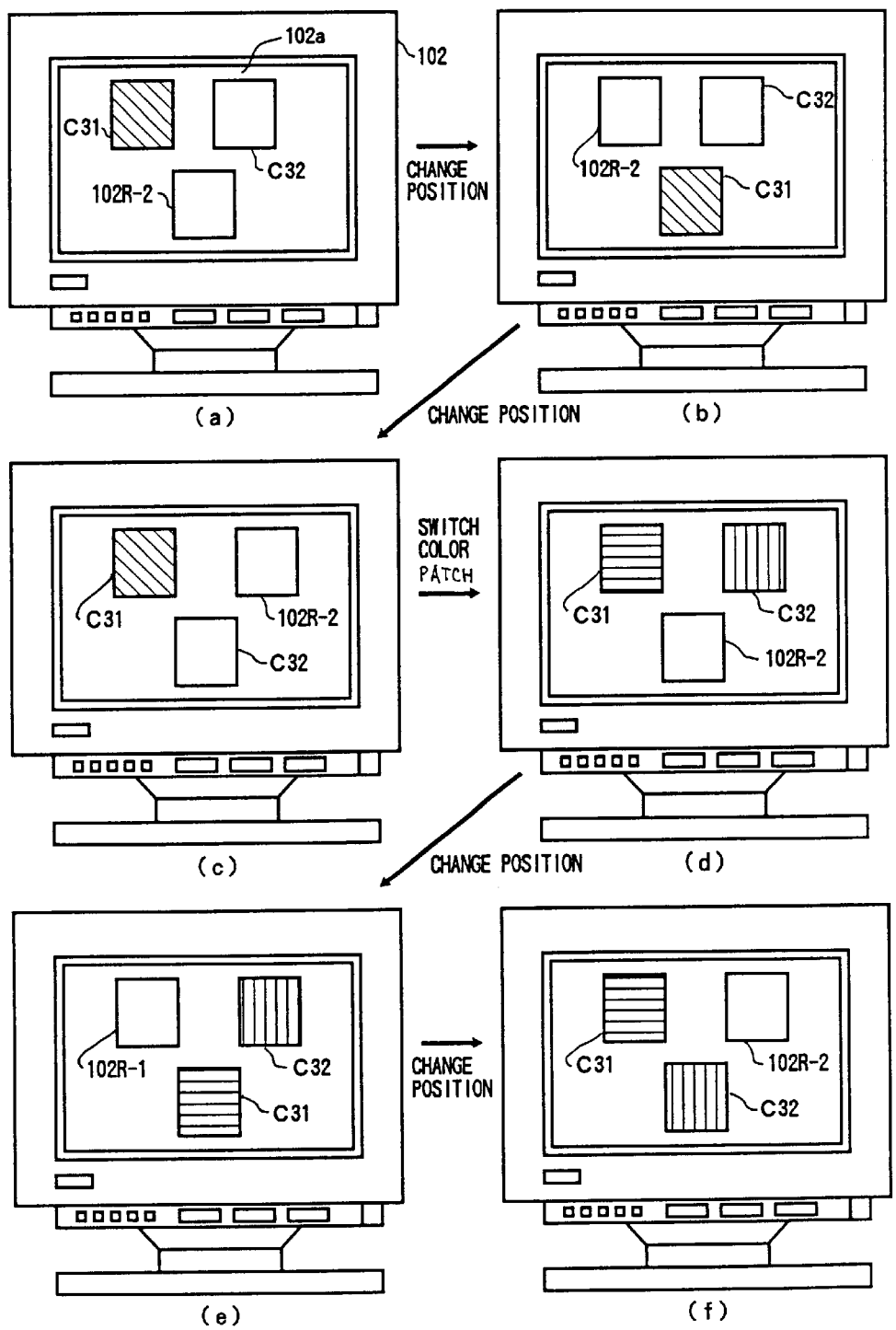
FIG. 27 is a diagram for explaining the operation of the ninth embodiment.

Next, a description will be given of a ninth embodiment of the information processing apparatus according to the present invention. FIG. 26 is a functional block diagram showing the construction within the main body part 101 of the computer system 100 in this embodiment. In FIG. 26, those parts which are the same as those corresponding parts in FIG. 21 are designated by the same reference numerals, and a description thereof will be omitted.

This embodiment is provided with a display position switching part 21. This display position switching part 21 can be formed by the CPU 201 shown in FIG. 7. The display position switching part 21 successively switches the display positions and displays a reference color patch 102R-2 and a plurality of measuring color patchs C31 and C32 which are respectively made up of a plurality of colors, according to a flow shown in FIGS. 27(a) through (f). Hence, by successively switching the display positions, displaying and measuring the reference color patch 102R-2 and the measuring color patchs C31 and C32, it is possible to carry out the measurements without being affected by the in-plane inconsistency of the display unit 102 even if the measurements cannot be made under the same conditions due to the power control or the like carried out by the display unit 102. As a result, this embodiment can create a highly accurate profile of the display unit 102, similarly to the eighth embodiment described above.

Figure 28:
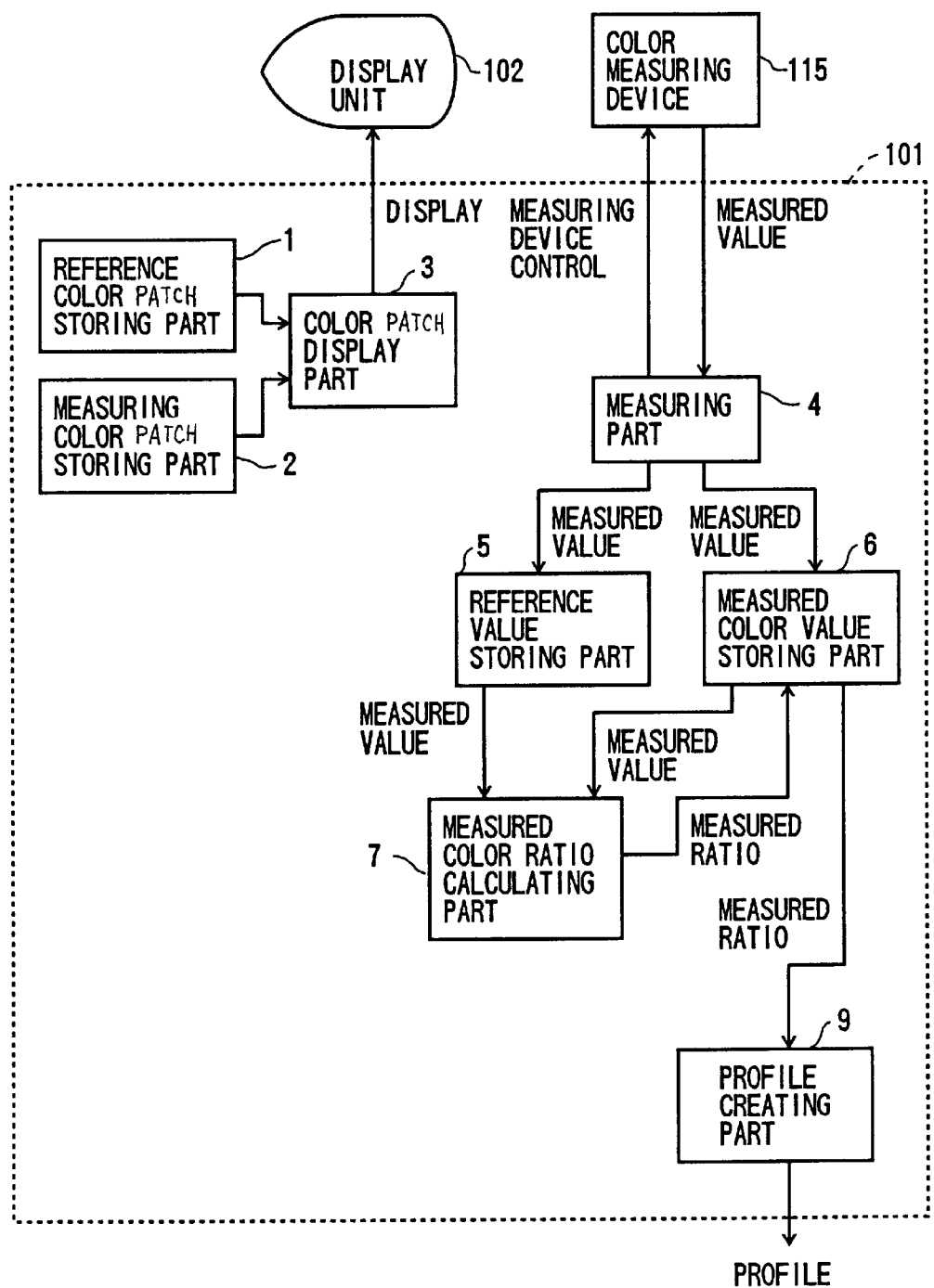
FIG. 28 is a functional block diagram showing the construction within the main body part of the computer system in a tenth embodiment.
Figure 29:
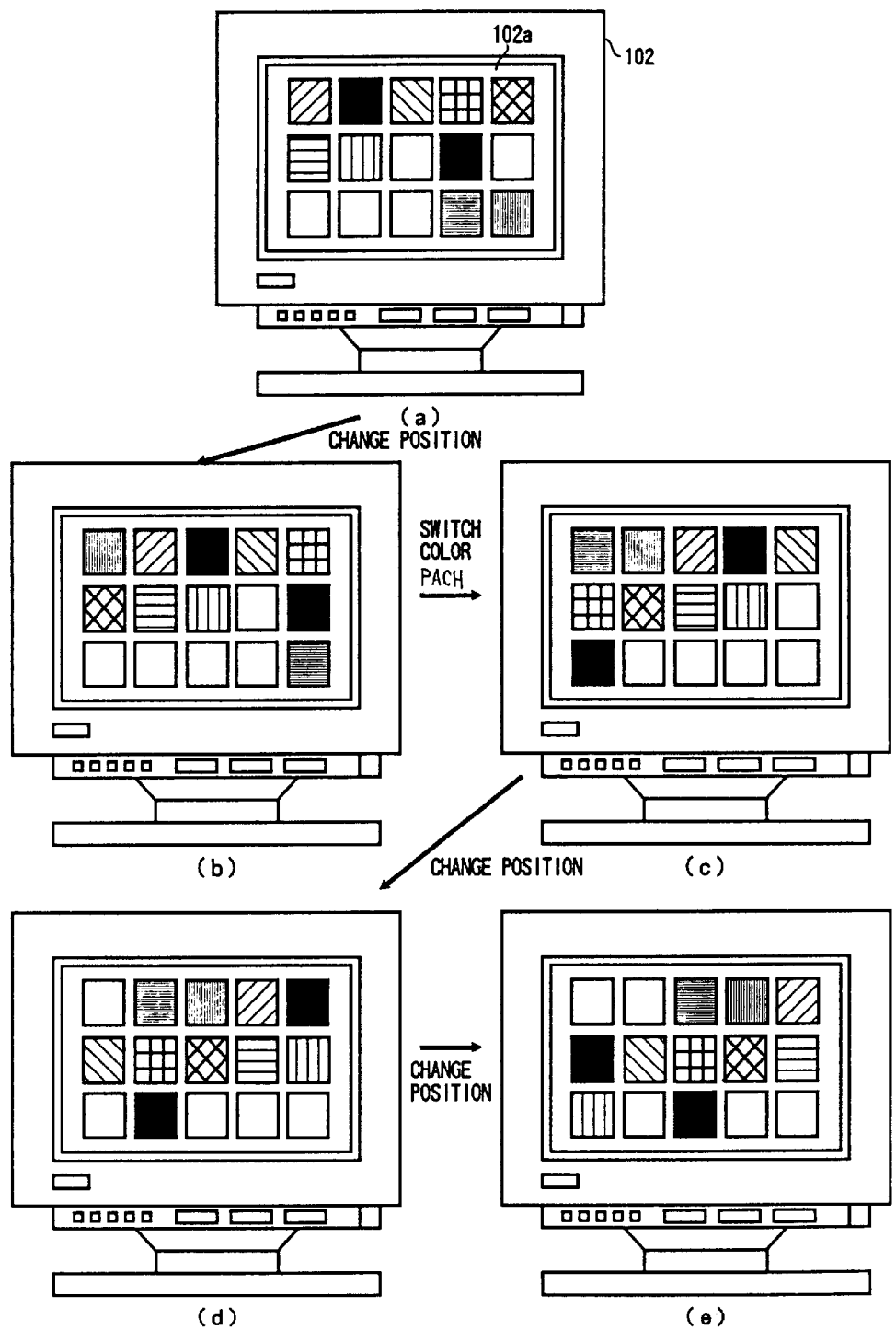
FIG. 29 is a diagram for explaining the operation of the tenth embodiment.

Next, a description will be given of a tenth embodiment of the information processing apparatus according to the present invention. FIG. 28 is a functional block diagram showing the construction within the main body part 101 of the computer system 100 in this embodiment. In FIG. 28, those parts which are the same as those corresponding parts in FIG. 21 are designated by the same reference numerals, and a description thereof will be omitted.

In this embodiment, the color patch stored in the measuring color patch storing part 2 includes all of the colors which must be measured in order to create the profile. In addition, all of these colors which must be measured in order to create the profile are simultaneously displayed on the display screen 102a, so that the reference value update part 8 and the display position switch part 21 can be omitted.

According to this embodiment, it is possible to minimize the scale of the circuit as compared to the seventh through ninth embodiments described above. In addition, it is possible to provide a display switching part similarly to the eighth embodiment, for example, in order to create a highly accurate profile which eliminates the effects of the in-plane inconsistency as in the case of the eighth or ninth embodiment. By providing such a display switching part, all of the colors necessary to create the profile can be measured at the same position, as may be seen from a flow shown in FIGS. 29(a) through (e), and the highly accurate profile can be created.

In each of the embodiments described above, the present invention is applied to a display unit which carries out the power control. However, the present invention is of course also applicable to display units such as a CRT which does not carry out the power control. Accordingly, the program for creating the profile according to the present invention can be used in common with respect to the display unit which carries out the power control and the display unit which does not carry out the power control, and is practical.

Further, the present invention is not limited to these embodiments, but various variations and modifications may be made without departing from the scope of the present invention.

What is claimed is:

1. An information processing apparatus comprising:
   a color display simultaneously displaying a distinct reference uniform color patch which is measured and at least one distinct measuring uniform color patch emitting color which is measured, where either measuring indicates truly emitted color emitted by the display.

2. An information processing apparatus according to claim 1, further comprising:
   color measuring means for measuring colors of the color patches which are displayed, where the color of the measuring color patch is measured while the measuring color patch and reference color patch are being displayed.

3. An information processing apparatus according to claim 2, further comprising profile generating means for generating a display profile based on the colors of the reference color patch and the measuring color patch, which are measured by said color measuring means.

4. The information processing apparatus as claimed in claim 3, which further comprises:
   storing means for storing said display profile.

5. An information processing apparatus comprising:
   a color display means simultaneously displaying a reference color patch and at least one measuring color patch which is to be measured, wherein said color display means includes control means for displaying the reference color patch and the measuring color patch at a predetermined display position by switching display positions of the reference color patch and the measuring color patch;
   color measuring means for measuring colors of the color patches which are displayed; and
   profile generating means for generating a display profile based on the colors of the reference color patch and the measuring color patch which are measured by said color measuring means.

6. A computer-readable storage medium which stores a program for causing a computer to perform as an apparatus according to claim 1.

7. A computer-readable storage medium which stores a program for causing a computer to perform as an apparatus according to claim 3.

8. The storage medium as claimed in claim 7, wherein said profile generating means causes the computer to generate the profile of said display unit based on a ratio of measured values of the colors of the reference color patch and the measuring color patch which are measured by said color measuring means.

9. The storage medium as claimed in claim 7, which further comprises:
   storing means for causing the computer to store said profile.

10. A computer-readable storage medium which stores a program for causing a computer to display an image, comprising:
    color display means for causing the computer to simultaneously display on a display unit a reference color patch and at least one measuring color patch which is to be measured, wherein said color display means includes control means for causing the computer to display the reference color patch and the measuring color patch at a predetermined position on said display unit by switching display positions of the reference color patch and the measuring color patch; and a storage to store results of the measuring.

11. An information processing apparatus according to claim 1, further comprising:

a calculating unit calculating a ratio of a measured value of the reference uniform color patch and a measured value of the measuring uniform color patch which are measured from the display; and a profiling unit creating profile data based on the ratio of the measured values.

12. A profile data creating method according to claim 11, wherein the reference color patch and the measured color patch are displayed with display areas which are identical.

13. A profile data creating method for creating profile data used to correct a display characteristic of a display unit corresponding to an input color signal, comprising:

simultaneously displaying, on a screen of the display unit, a reference color patch which is used as a reference color, and a measuring color patch of a color different from that of the reference color patch;

calculating a ratio of a measured value of the reference color patch and a measured value of the measuring color patch which are measured from the screen;

creating profile data based on the ratio of the measured values; and a moving step moving the referenced color patch of the measuring color patch, the color of which is to be measured, to a specific position on the screen, wherein said calculating the ratio of the measured value of the measuring color patch is based on a measured value of the color patch which is moved to the specific position.

14. An information processing apparatus according to claim 1, wherein relative values of a measured value of the reference uniform color patch and of a measured value of the measuring uniform color patch are calculated, and profile data based on the calculated relative values is created.

15. An information processing apparatus according to claim 1, wherein the uniform reference color is predetermined, wherein the measurement uniform color is chosen from a plurality of measurement colors;

wherein the displaying and measuring is repeated for each measurement color in the plurality of measurement colors, wherein measurements of the measurement uniform colors are normalized using the measurements of the reference color, and wherein the normalized measurement colors relative to the measurements of the reference color are used to generate a profile of the display.

16. The apparatus according to claim 1, wherein the measurement color is chosen from a plurality of measurement colors.

17. The apparatus according to claim 16, wherein said displaying and measuring is repeated for each measurement color in the plurality of measurement colors.

18. The apparatus according to claim 1, wherein the measurement of the measurement color is normalized using the measurement of the reference color.

19. The apparatus according to claim 18, wherein a profile is generated based on said normalizing.

20. The apparatus according to claim 1, wherein the measurement of the measurement color is normalized using the measurement of the reference color as a basis to form a normalized measurement color.

21. The apparatus according to claim 20, wherein the profile is generated based on the normalized measurement color and the measurement of the reference color.

22. The information processing apparatus as claimed in claim 3, wherein multiple measuring patches of different colors are measured, and wherein said profile generating means generates the display profile based on the measured value of the reference color patch and the measurements of the measuring color patches which are measured by said color measuring means.

* * * * *